(12) United States Patent
Hashimoto et al.

(10) Patent No.: US 10,261,725 B2
(45) Date of Patent: Apr. 16, 2019

(54) STORAGE SYSTEM CAPABLE OF INVALIDATING DATA STORED IN A STORAGE DEVICE THEREOF

(71) Applicant: Toshiba Memory Corporation, Tokyo (JP)

(72) Inventors: Daisuke Hashimoto, Cupertino, CA (US); Shinichi Kanno, Ota Tokyo (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 99 days.

(21) Appl. No.: 15/015,052

(22) Filed: Feb. 3, 2016

(65) Prior Publication Data

US 2016/0299715 A1 Oct. 13, 2016

Related U.S. Application Data

(60) Provisional application No. 62/145,970, filed on Apr. 10, 2015.

(51) Int. Cl.
*G06F 3/06* (2006.01)
*G06F 12/02* (2006.01)

(52) U.S. Cl.
CPC .......... *G06F 3/0679* (2013.01); *G06F 3/0604* (2013.01); *G06F 3/0652* (2013.01); *G06F 12/0246* (2013.01); *G06F 12/0253* (2013.01); *G06F 2212/1016* (2013.01); *G06F 2212/7201* (2013.01); *G06F 2212/7205* (2013.01); *G06F 2212/7209* (2013.01)

(58) Field of Classification Search
CPC ...... G06F 3/0619; G06F 3/061; G06F 3/0655; G06F 3/0679; G06F 12/0246; G06F 12/0253; G06F 2212/1016; G06F 2212/7201; G06F 2212/7205; G06F 2212/7209

See application file for complete search history.

(56) References Cited

U.S. PATENT DOCUMENTS

| 8,032,724 | B1 | 10/2011 | Smith |
| 8,041,878 | B2 | 10/2011 | Lee |
| 8,874,872 | B2 | 10/2014 | Feldman et al. |
| 8,935,302 | B2 | 1/2015 | Flynn et al. |
| 9,026,734 | B2 | 5/2015 | Hashimoto |
| 9,229,854 | B1 * | 1/2016 | Kuzmin ............. G06F 12/0246 |
| 9,274,942 | B2 | 3/2016 | Hashimoto |

(Continued)

OTHER PUBLICATIONS

U.S. Appl. No. 14/656,413, filed Mar. 12, 2015.

(Continued)

*Primary Examiner* — Nanci N Wong
(74) *Attorney, Agent, or Firm* — Kim & Stewart LLP

(57) ABSTRACT

A storage device includes a non-volatile semiconductor storage device including a plurality of physical blocks, and a controller. The controller is configured to maintain a mapping of logical addresses to locations within the physical blocks, send, to a host, a first list that contains logical addresses corresponding to one or more target physical block that are targeted for garbage collection, and then receive, from the host, a second list that contains one or more logical addresses in the first list, and invalidate data stored in the logical addresses in the second list prior to the garbage collection.

15 Claims, 23 Drawing Sheets

(56) References Cited

U.S. PATENT DOCUMENTS

| | | | |
|---|---|---|---|
| 2003/0177435 A1* | 9/2003 | Budd | H03M 13/096 714/776 |
| 2006/0288153 A1* | 12/2006 | Tanaka | G06F 12/0246 711/103 |
| 2009/0177721 A1* | 7/2009 | Mimatsu | H04L 67/1097 |
| 2009/0265506 A1* | 10/2009 | Yim | G06F 3/0605 711/103 |
| 2010/0250863 A1* | 9/2010 | Arndt | G06F 9/5077 711/147 |
| 2011/0055455 A1* | 3/2011 | Post | G06F 12/0246 711/103 |
| 2013/0007352 A1* | 1/2013 | Maislos | G06F 12/0246 711/103 |
| 2014/0129761 A1* | 5/2014 | Kwon | G06F 12/0246 711/103 |
| 2014/0215129 A1 | 7/2014 | Kuzmin et al. | |
| 2014/0281260 A1* | 9/2014 | Peterson | G06F 3/0616 711/135 |
| 2014/0325115 A1* | 10/2014 | Ramsundar | G06F 12/0238 711/102 |
| 2014/0365719 A1 | 12/2014 | Kuzmin et al. | |
| 2015/0019797 A1* | 1/2015 | Huang | G06F 12/0246 711/103 |
| 2015/0222705 A1* | 8/2015 | Stephens | G06F 3/0611 709/214 |
| 2015/0331624 A1 | 11/2015 | Law | |
| 2015/0347025 A1 | 12/2015 | Law | |
| 2016/0034354 A1 | 2/2016 | Hashimoto et al. | |
| 2016/0062677 A1* | 3/2016 | Samuels | G06F 3/0616 711/103 |
| 2016/0162416 A1* | 6/2016 | Boyd | G06F 13/28 711/202 |

OTHER PUBLICATIONS

U.S. Appl. No. 15/065,465, filed Mar. 9, 2016.
U.S. Appl. No. 15/065,496, filed Mar. 9, 2016.
U.S. Appl. No. 15/015,047, filed Feb. 3, 2016.
U.S. Appl. No. 15/063,311, filed Mar. 7, 2016.
Jeong-Uk Kang et., "The Multi-streamed Solid-State Drive", Proceedings of the 6th USENIX Conference on Hot Topics in Storage and File Systems, Jun. 17-18, 2014, 5 pages.
Changman Lee et al., F2FS: A New File System for Flash Storage, 13th USENIX Conference on File and Storage Technologies, Feb. 2015, pp. 273-286.
Jaeho Kim et al., Towards SLO Complying SSDs Through OPS Isolation, 13th USENIX Conference on File and Storage Technologies, Feb. 2015, pp. 183-189.
2015 Non-Volatile Memories Workshop, The Multi-Streamed Solid-State Drive, 7 pages, Mar. 2015.

* cited by examiner

STORAGE SYSTEM CAPABLE OF INVALIDATING DATA STORED IN A STORAGE DEVICE THEREOF

CROSS-REFERENCE TO RELATED APPLICATION

This application is based upon and claims the benefit of priority from U.S. Provisional Patent Application No. 62/145,970, filed Apr. 10, 2015, the entire contents of which are incorporated herein by reference.

FIELD OF THE INVENTION

This invention generally relates to a storage system including a host and a storage device, and more particularly, to a storage system that is capable of invalidating data stored in the storage device.

BACKGROUND OF THE INVENTION

A storage system usually includes a host and a storage device, such as a non-volatile memory device. The storage device typically includes a plurality of physical blocks for storing data, and upon receiving a write command from the host, writes data to one of the physical blocks that is designated for writing the data. After the data are written to the storage device, the host may send a command (trim command) to invalidate the written data, for example when new data overwrite the written data. As a result, data written in the storage device may include both valid and invalid data.

When a capacity of free space in the physical blocks decreases to a certain level, one type of storage device carries out garbage collection with respect to some of the physical blocks in which data are written. Garbage collection is a process of copying all valid data from target physical blocks to another physical block, and erasing the target physical blocks. By erasing the target physical blocks, the target physical blocks can be used for new data writing.

However, even if the data written in the storage device is valid, in some cases the data may not need to be stored in the storage device any more. In such cases, it would be unnecessary to copy such data during the garbage collection, and copying such data would cause an increase in the latency of garbage collection.

SUMMARY OF THE INVENTION

In general, according to an embodiment, a storage device includes a non-volatile semiconductor storage device including a plurality of physical blocks, and a controller. The controller is configured to maintain a mapping of logical addresses to locations within the physical blocks, send, to a host, a first list that contains logical addresses corresponding to one or more physical blocks targeted for garbage collection, and then receive, from the host, a second list that contains one or more logical addresses in the first list, and invalidate data stored in the logical addresses in the second list prior to the garbage collection.

Further, according to an embodiment, a computing device comprising a processing unit programmed to carry out a method of communicating with a storage device including a plurality of physical blocks. The method includes receiving from the storage device, a first list that contains logical addresses corresponding to one or more target physical blocks that are targeted for garbage collection, generating a second list that contains one or more logical addresses in the first list, and transmitting the second list to the storage device, so as to cause the storage device to invalidate data stored in the logical addresses in the second list prior to the garbage collection.

Further, according to an embodiment, a storage device includes a non-volatile semiconductor storage device including a plurality of physical blocks, and a controller. The controller is configured to maintain a mapping of logical addresses to locations within the physical blocks, receive from a host a write command, and in response thereto, store first information indicating expiration time of data associated with the write command. When the expiration time passes, the controller is configured to determine the data as no longer valid.

DETAILED DESCRIPTION OF THE INVENTION

Figure 1:
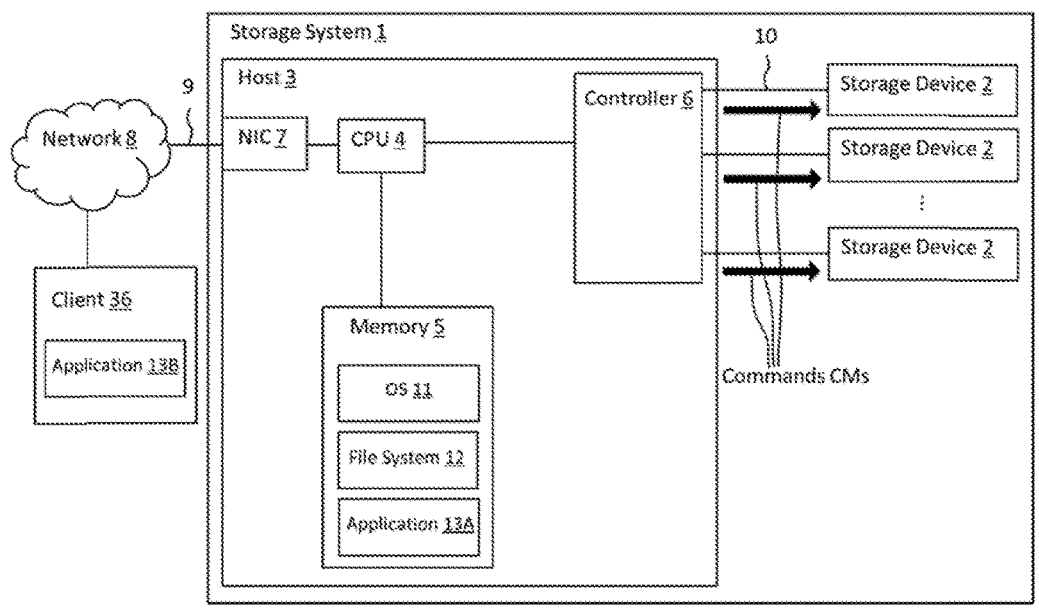
FIG. 1 illustrates a configuration of a storage system according to a first embodiment.

Details of the present disclosure are described below with reference to the drawings.
(First Embodiment)
[Storage System]
FIG. 1 illustrates a configuration of a storage system 1 coupled to a client 36 via a network 8, according to an embodiment. The storage system 1 includes a host 3, one or more storage devices 2, and an interface 10 configured to connect the host 3 and each of the storage devices 2. In the present embodiment, the storage device 2 is, for example, an SSD (Solid State Drive), which is a nonvolatile storage device. Alternatively, the storage device 2 can include other storage devices such as a hard disk drive (HDD), a hybrid drive, an SD card, a USB memory, an embedded Multi Media Card (eMMC), and a storage device and a memory node described in United States Patent Application Publication No. 2012/0117354, the entire contents of which are incorporated by reference herein. Further, in the present embodiment, the interface 10 uses SAS (Serial Attached SCSI) protocol. Alternatively, the interface 10 can use any other technically feasible protocol, such as PCI Express (Peripheral Component Interconnect Express, PCIe), USB (Universal Serial Bus), SATA (Serial Advanced Technology Attachment), Thunderbolt®, Ethernet®, Fibre Channel, and the like.

The host 3 includes a CPU 4, a memory 5, a controller 6, and a Network Interface Controller (NIC) 7. The CPU (processing unit) 4 is a central processing unit of the host 3, and performs various calculations and control operations in the host 3. The CPU 4 and the controller 6 are connected by an interface using a protocol such as PCI Express. The CPU 4 performs control of storage device 2 via the controller 6. The controller 6 is an SAS expander in this embodiment, but PCIe Switch, PCIe expander, RAID controller, JBOD controller, and the like may be used as the controller 6. The CPU 4 also performs control of the memory 5. The memory 5 is, for example, a DRAM (Dynamic Random Access Memory), a MRAM (Magnetoresistive Random Access Memory), a ReRAM (Resistance Random Access Memory), and a FeRAM (Ferroelectric Random Access Memory).

The CPU 4 is a processor configured to control the operation of the host 3. The CPU 4 executes, for example, an operating system (OS) 11 loaded from one of the storage devices 2 to the memory 5. The CPU 4 is connected to the NIC 7, which is connected to the network via a network interface 9. The network interface 9 uses a protocol, for example, an Ethernet, InfiniBand, Fibre Channel, PCI Express Fabric, WiFi, and the like.

The memory 5 temporarily stores a program and data and functions as a working memory of the CPU 4. The memory 5 includes a memory area for storing OS 11, a memory area for storing a file system 12, and a memory area for storing application software layer 13A. As is generally known, the OS 11 represents system software for managing the host 3, and may be a commodity OS such as Linux® and Windows®, or a virtualization software available from VMware, Inc. The OS 11 operates to manage an input to and an output from the host 3, the storage devices 2, and the memory 5, and enable software to use components in the storage system 1, including the storage devices 2. The file system driver 12 is used to control the manner of data writing to the storage device 2 and data reading from the storage device 2. The file system 12 may be, for example, ZFS, Btrfs, XFS, ext4, and NTFS. Alternatively, the file system 12 may be an object storage system (such as Ceph Object Storage Daemon) and a key value store system (such as Rocks DB).

The host 3 sends, to the storage device 2 via the interface 10, a variety of commands CMs for data writing to and data reading from the storage device 2. The commands CM include a write command, a read command, a Flush command, a Get Capacity of Free Space (GCFS) command, a Get LBA List (GLL) command, an Unmap command, and an Open Stream command, and the like, as described below in detail.

Figure 2:
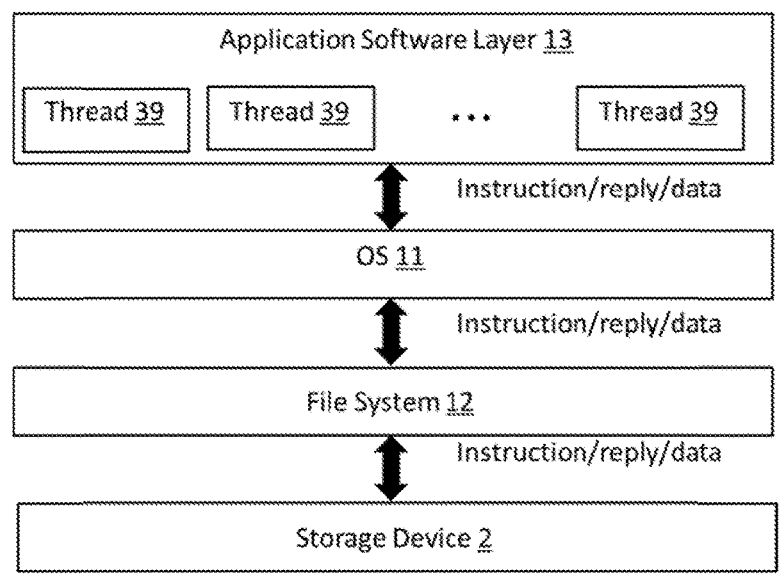
FIG. 2 illustrates a software layer structure of the storage system according to the first embodiment.

In addition, the application software layers 13A and 13B (collectively 13) are loaded, respectively, in the memory 5, and a client device 36, which is connected to the storage system 1 through the network 8. FIG. 2 illustrates a structure of software layers in the storage system 1 according to the present embodiment. Usually, the application software layer 13 loaded in the memory 5 and/or the client 36 does not directly communicate with the storage device 2 and instead communicates with the storage device 2 through the OS 11 loaded in the memory 5. Further, the OS 11 communicates with the storage device 2 through the file system 12 loaded in the memory 5. When the application software layer 13 transmits to the storage device 2 a request, such as a read request or a write request, which is initiated by the host 3 and/or the client device 36, the application software layer 13 first transmits a request to the OS 11, and then the OS 11 transmits a request to the file system 12. The file system 12 specifies one or more logical addresses (LBA: Logical Block Address) of the storage device 2 corresponding to the request, and then transmits a command, the one or more LBAs, and data associated with the one or more LBAs, to the storage device 2 via the interface 10. Upon receiving a response from the storage device 2, the file system 12 transmits a response to the OS 11, and then the OS 11 transmits a response to the application software layer 13.

Figure 3:
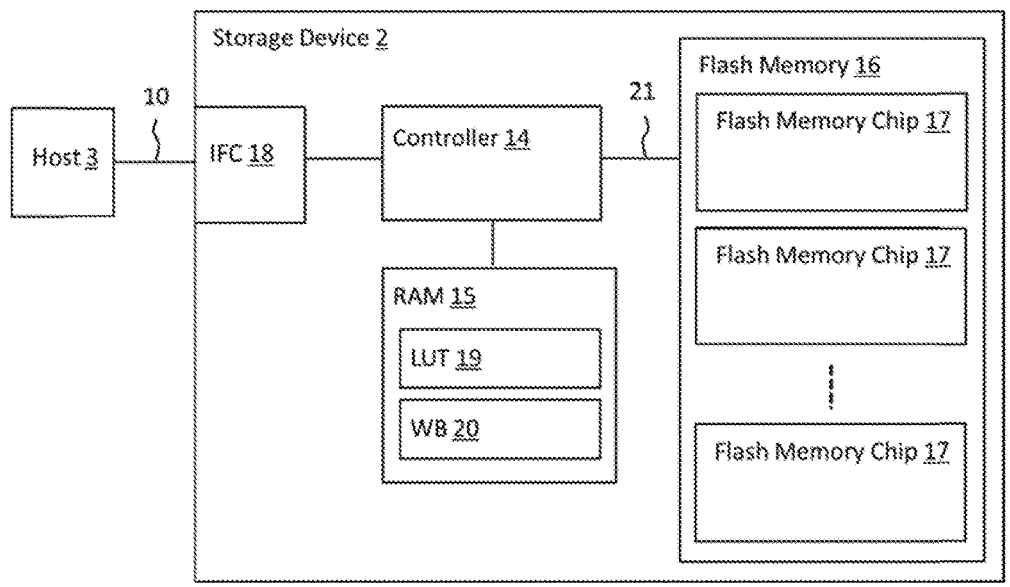
FIG. 3 illustrates a configuration of a storage device in the storage system according to the first embodiment.

When the application 13 is executed, a number of application software threads 39 run. The application software threads 39 includes, for example, client software, database software (e.g., Cassandra DB, Mongo DB, HBASE, and etc.), Distributed Storage System (Ceph etc.), Virtual Machine (VM), guest OS, and Analytics Software (e.g., Hadoop, R, and etc.).
[Storage Device]
FIG. 3 illustrates a configuration of the storage device 2 according to the present embodiment. The storage device 2 functions as an SSD, and includes a controller 14, a random access memory (RAM) 15, a non-volatile semiconductor memory, such as a NAND flash memory 16 (hereinafter flash memory), and an interface controller (IFC) 18. The IFC 18 is configured to perform transmission and reception of signals to and from the host 3 via the interface 10. The RAM 15 functions as a semiconductor memory, and includes an area storing a look-up table (LUT) 19 for managing mappings between LBAs and physical addresses of the flash memory 16, and a write buffer (WB) 20. The controller 14 is configured to manage and control the flash memory 16, the RAM 15, and the IFC 18.

The RAM 15 is, for example, a volatile RAM, such as a DRAM (Dynamic Random Access Memory) and a SRAM (Static Random Access Memory), or a nonvolatile RAM, such as a FeRAM (Ferroelectric Random Access Memory), an MRAM (Magnetoresistive Random Access Memory), a PRAM (Phase Change Random Access Memory), and a ReRAM (Resistance Random Access Memory). The RAM 15 may be embedded in the controller 14.

The flash memory 16 includes one or more flash memory chips 17 and stores user data designated by the host 3 in one or more of the flash memory chips 17. The controller 14 and the flash memory 16 are connected via a flash memory interface 21, such as Toggle and ONFI.

[Flash Memory Chip]

Figure 4:
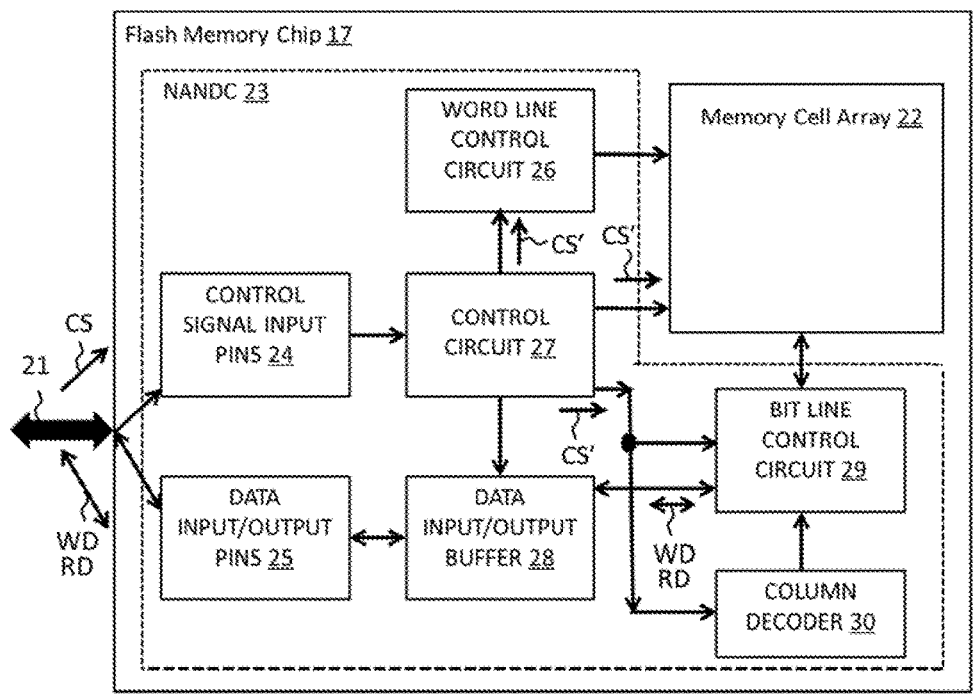
FIG. 4 illustrates a configuration of a flash memory chip in a flash memory of the storage device.

FIG. 4 illustrates a configuration of the flash memory chip 17. The flash memory chip 17 includes a memory cell array 22 and a NAND controller (NANDC) 23. The memory cell array 22 includes a plurality of memory cells arranged in a matrix configuration, each storing data, as described below in detail. The NANDC 23 is a controller configured to control access to the memory cell array 22.

Specifically, the NANDC 23 includes signal input pins 24, data input/output pins 25, a word line control circuit 26, a control circuit 27, a data input/output buffer 28, a bit line control circuit 29, and a column decoder 30. The control circuit 27 is connected to the control signal input pins 24, the word line control circuit 26, the data input/output buffer 28, the bit line control circuit 29, and the column decoder 30, and controls circuit components of the NANDC 23. Also, the memory cell array 22 is connected to the word line control circuit 26, the control circuit 27, and the data input/output buffer 28. Further, the control signal input pins 24 and the data input/output pins 25 are connected to the controller 14 of the storage device 2, through the flash interface 21.

When data are read from the flash memory chip 17, data in the memory cell array 22 are output to the bit line control circuit 29 and then temporarily stored in the data input/output buffer 28. Then, the read data RD are transferred to the controller 14 of the storage device 2 from the data input/output pins 25 through the flash interface 21. When data are written to the flash memory chip 17, data to be written (write data WD) are input to the data input/output buffer 28 through the data input/output pins 25. Then, the write data WD are transferred to the column decoder 30 through the control circuit 27, and input to the bit line control circuit 29 by the column decoder 30. The write data WD are written to memory cells of the memory cell array 22 with a timing controlled by the word line control circuit 26 and the bit line control circuit 29.

When control signals CS are input to the flash memory chip 17 from the controller 14 of the storage device 2 through the flash interface 21, the control signals CS are input through the control signal input pins 24 into the control circuit 27. Then, the control circuit 27 generates control signals CS', according to the control signals CS from the controller 14, and controls voltages for controlling memory cell array 22, bit line control circuit 29, column decoder 30, data input/output buffer 28, and word line control circuit 26. Here, a circuit section that includes the circuits other than the memory cell array 22 in the flash memory chip 17 is referred to as the NANDC 23.

Figure 5:
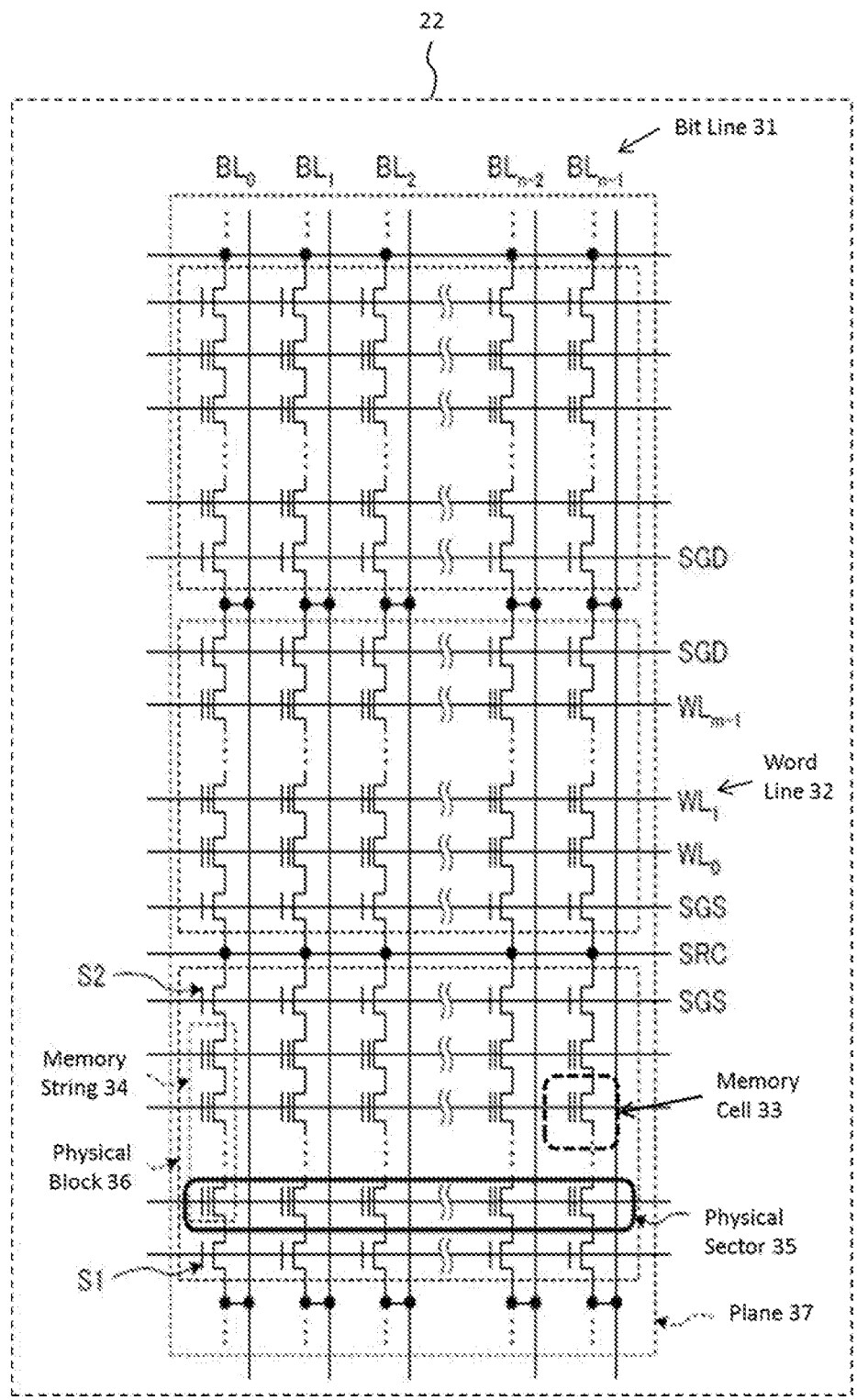
FIG. 5 illustrates detailed circuit structure of a memory cell array in the flash memory chip.

FIG. 5 illustrates detailed circuit structure of the memory cell array 22. The memory cell array 22 includes one or more planes 37, each plane 37 includes a plurality of physical blocks 36, and each physical block 36 includes a plurality of memory strings 34. Further, each of the memory strings (MSs) 34 includes a plurality of memory cells 33.

The memory cell array 22 further includes a plurality of bit lines 31, a plurality of word lines 32, and a common source line. The memory cells 33, which are electrically data-rewritable, are arranged in a matrix configuration at intersections of bit lines 31 and the word lines. The bit line control circuit 29 is connected to the bit lines 31 and the word line control circuit 26 is connected to the controlling word lines 32, so as to control data writing and reading with respect to the memory cells 33. That is, the bit line control circuit 29 reads data stored in the memory cells 33 via the bit lines 31, and applies a write control voltage to the memory cells 33 via the bit lines 31 and writes data in the memory cells 33 selected by the word line 32.

In each memory string (MS) 34, the memory cells 33 are connected in series, and selection gates S1 and S2 are connected to both ends of the MS 34. The selection gate S1 is connected to a bit line BL 31 and the selection gate S2 is connected to a source line SRC. Control gates of the memory cells 33 arranged in the same row are connected in common to one of word lines 32 WL0 to WLm−1. First selection gates S1 are connected in common to a select line SGD, and second selection gates S2 are connected in common to a select line SGS.

A plurality of memory cells 33 connected to one word line 32 configures one physical sector 35. Data are written and read for each physical sector 35. In the one physical sector 35, data equivalent to two physical pages (two pages) are stored when 2 bit/cell write system (MLC, four-level) is employed, and data equivalent to one physical page (one page) are stored when 1 bit/cell write system (SLC, two-level) is employed. Further, when 3 bit/cell write system (TLC, eight-level) is employed, data equivalent to three physical pages (three pages) are stored in the one physical sector 35. Further, data are erased in a unit of the physical block 36.

During a write operation, a read operation, and a program verify operation, one word line WL is selected according to a physical address, such as a row address, received from the controller 14, and, as a result, one physical sector 35 is selected. Switching of a page in the selected physical sector 35 is performed according to a physical page address in the physical address. In the present embodiment, the flash memory 16 employs the 2 bit/cell write method, and the controller 14 controls the physical sector 35, recognizing that two pages, i.e., an upper page and a lower page, are allocated to the physical sector 35, as physical pages. A physical address comprises physical page addresses and physical block address. A physical page address is assigned to each of the physical pages, and a physical block address is assigned to each of the physical blocks 36.

Figure 6:
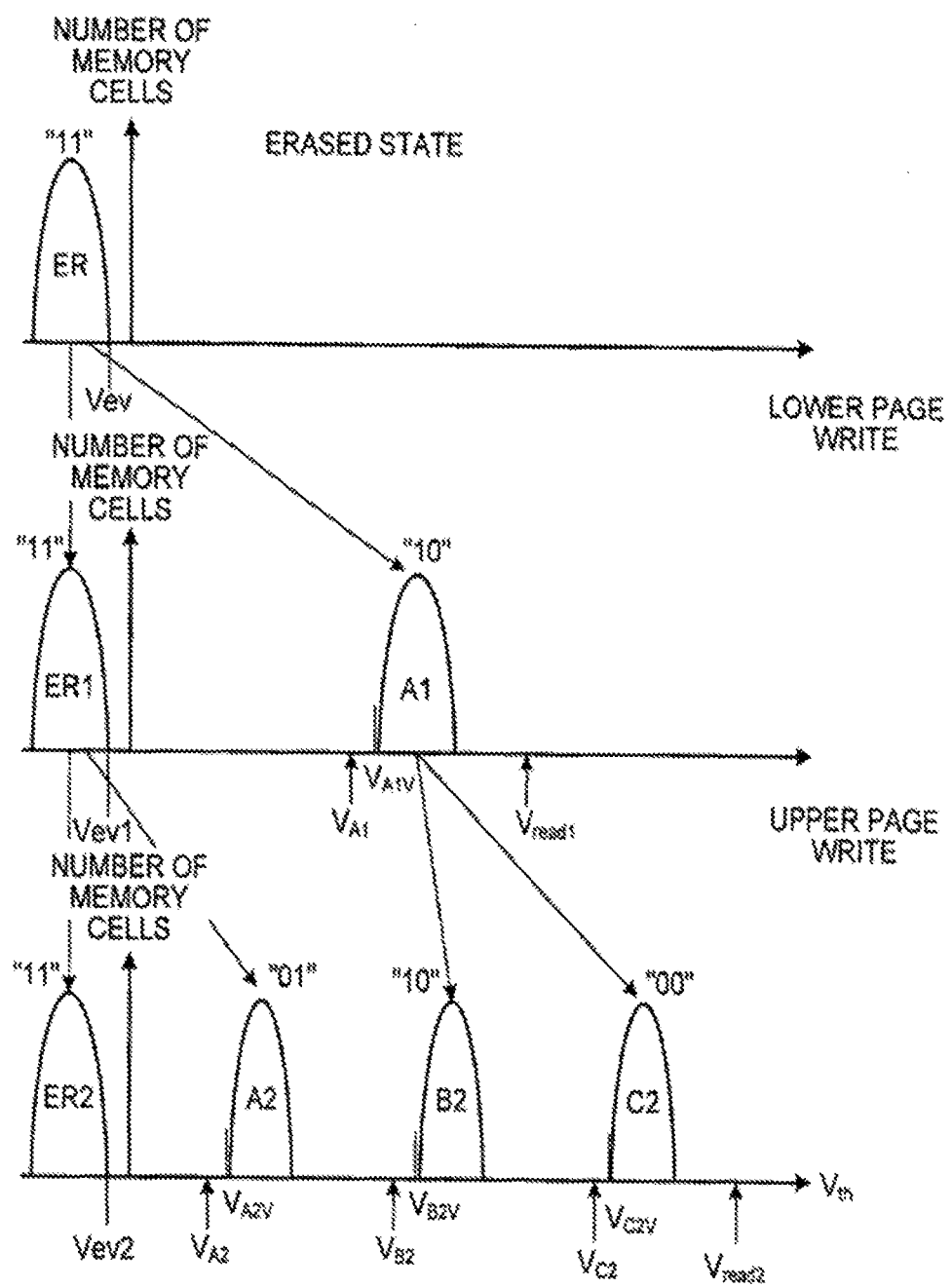
FIG. 6 illustrates a relation between 2-bit four-level data stored in a memory cell of a four-level NAND cell type and a threshold voltage distribution of each level.

The four-level NAND memory of 2 bit/cell is configured such that a threshold voltage in one memory cell could have four kinds of distributions. FIG. 6 illustrates a relation between 2-bit four-level data (data "11", "01", "10", and "00") stored in a memory cell 33 of a four-level NAND cell type and a threshold voltage distribution of each level. 2-bit data of one memory cell 33 includes lower page data and upper page data. The lower page data and the upper page data are written in the memory cell 33 according to separate write operations, e.g., two write operations. Here, when data are represented as "XY," "X" represents the upper page data and "Y" represents the lower page data.

Each of the memory cells 33 includes a memory cell transistor, for example, a MOSFET (Metal Oxide Semiconductor Field Effect Transistor) having a stacked gate structure formed on a semiconductor substrate. The stacked gate structure includes a charge storage layer (a floating gate electrode) formed on the semiconductor substrate via a gate insulating film and a control gate electrode formed on the floating gate electrode via an inter-gate insulating film. A threshold voltage of the memory cell transistor changes according to the number of electrons accumulated in the floating gate electrode. The memory cell transistor stores data by varying the threshold voltage thereof.

In the present embodiment, each of the memory cells 33 employs a write system of a four-level store method for 2 bit/cell (MLC), using an upper page and a lower page. Alternatively, the memory cells 33 may employ a write system of a two-level store method of 1 bit/cell (SLC), using a single page, an eight-level store method for 3 bit/cell (TLC), using an upper page, a middle page, and a lower page, or a multi-level store method for 4 bit/cell (QLC) or more, or mixture of them. The memory cell transistor is not limited to the structure including the floating gate electrode and may be a structure such as a MONOS (Metal-Oxide-Nitride-Oxide-Silicon) type that can adjust a threshold voltage by trapping electrons on a nitride interface functioning as a charge storage layer. Similarly, the memory cell transistor of the MONOS type can be configured to store data of one bit or can be configured to store data of a multiple bits. The memory cell transistor can be, as a nonvolatile storage medium, a semiconductor storage medium in which memory cells are three-dimensionally arranged as described in U.S. Pat. No. 8,189,391, United States Patent Application Publication No. 2010/0207195, and United States Patent Application Publication No. 2010/0254191, the entire contents of all of which are incorporated by reference herein.

[Block Management in the Storage Device]

Figure 7:
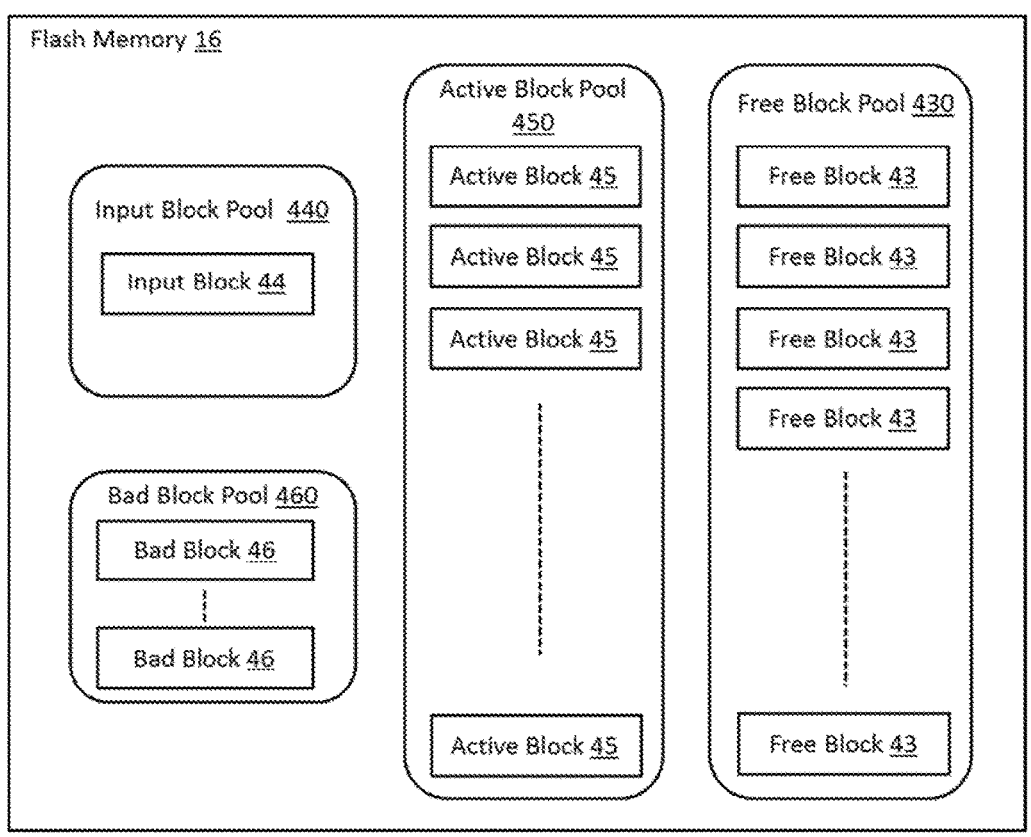
FIG. 7 illustrates an overview of the mapping of physical blocks based on block pools according to the first embodiment.

According to the present embodiment, the controller 14 of the storage device 2 manages the physical blocks 36 of the flash memory 16, by logically mapping the block in one of several different block pools, using the LUT 19 (shown in FIG. 3). FIG. 7 illustrates an overview of the mapping of the physical blocks based on block pools. The block pools here include a free block pool 430, an input block pool 440, an active block pool 450, and a bad block pool 460. The controller 14 maps each of the physical blocks 36, in the LUT 19, based on whether or not data are stored in the block and a type of data stored in the block, if any.

When no valid data are stored in a block, then the controller 14 maps the block as a free block 43 and maps the free block 43 in the free block pool 430. That is, free blocks 43 in the free block pool 430 are physical blocks that currently do not store valid data. When the block has a space in which write data is supposed to be written, then the controller 14 maps the block as an input block 44 in the input block pool 440. That is, the input block 44 is a partially written physical block into which the controller 14 can write data without first erasing the entire input block. In other words, there is an unwritten space in the input block 44. When the input block 44 becomes full, then the controller 14 re-maps the input block 44 as an active block 46 and maps the active block 46 in the active block pool 460. That is, active blocks 46 are physical blocks that store valid data. When a block is defective, then the controller 14 maps the defective block as a bad block 46 and maps the bad block 46 in the bad block pool 460. That is, bad blocks 46 are physical blocks that are no longer usable for storing data.

In such a manner, the LUT 19 (shown in FIG. 3) manages a physical block address list of the free blocks 43, the input blocks 44, the active blocks 45, and the bad blocks 46, respectively. Other configurations of different types of block pools may be also managed in the LUT 19.

[Operations in the Storage System]

Next, various operations carried out in the storage system 1 according to the present embodiment are described, with reference to FIGS. 8-13.

Figure 8:
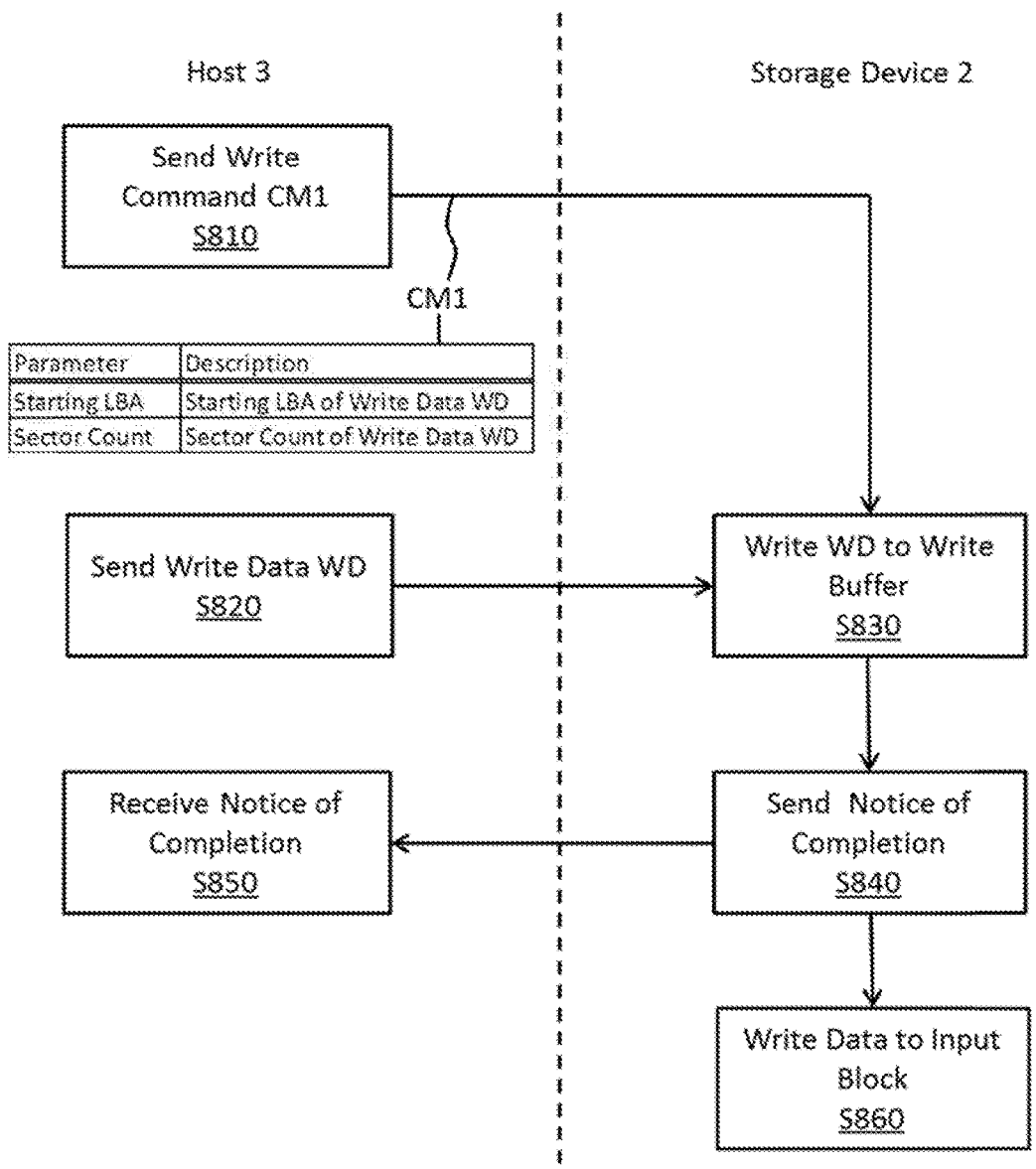
FIG. 8 illustrates a flow of a data writing operation carried out in the storage system according to the first embodiment.

FIG. 8 illustrates a flow of the data writing operation carried out in the storage system 1. When the data writing operation is carried out, the host 3 first transmits a write command (write request) CM1 to the storage device 2 via the interface 10 at Step S810.

When the host 3 transmits the write command CM1 to the storage device 2, the host 3 includes a logical address of block in which data are to be written, in the write command CM1. In the present embodiment, the logical address is LBA, but may be Object ID or Object Key, instead of LBA. The LBA is a logical address in which serial numbers are given to logical sectors (size: e.g., 512 Bytes) starting from 0. Thus, when the host 3 issues the write command CM1 to the storage device 2, the host 3 transmits the write command CM1, including a LBA (a starting LBA of the write data) and logical sector count (data size) for which the write command CM1 is issued.

The write command CM1 includes parameters of a starting LBA, which is a starting LBA of data to be written (write data WD) and a logical sector count of the write data WD. Then, the host 3 transmits the write data WD to the storage device 2 at Step S820. After the storage device 2 receives the write command CM1 and the write data WD, then the controller 14 of the storage device 2 stores the write data WD in the write buffer (WB) 20 at Step S830. Then, at Step S840, the controller 14 sends a notice of completion to the host 3. At Step S850, the host 3 receives the notice of completion from the storage device 2, and the data writing operation on the side of the host 3 ends.

Subsequently, the controller 14 writes the write data WD stored in the WB 20 to a portion of the flash memory 16 located at physical addresses corresponding to the LBA included in the write command CM1, by referring to the LUT 19, at Step S860. The mapping between the LBAs and the physical addresses are dynamic, so the mapping may be updated according to data management in the storage device 2.

Figure 9:
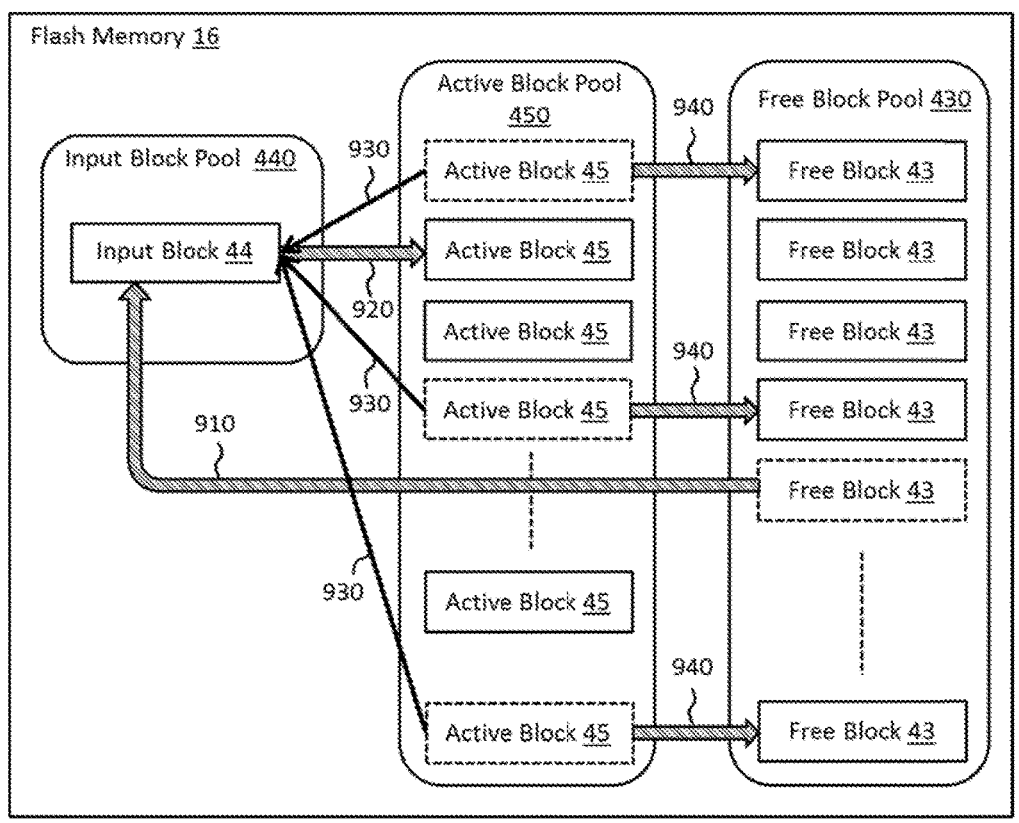
FIG. 9 schematically illustrates re-mapping of physical blocks.

There are some circumstances where the physical blocks of the flash memory 16 are re-mapped as a different block. FIG. 9 schematically illustrates re-mapping of physical blocks. As shown by an arrow 910, when there is no available input block 44 in the input block pool 440, the controller 14 re-maps (allocates) a free block 43 in the free block pool 430 as a new input block 44, and erase data stored in the free block 43 (if any). As shown by an arrow 920, when no physical page in an input block 44 is available for data writing without erasing written data, the controller 14 re-maps (moves) the input block 44 as an active block 45 in the active block pool 450. Further, when there are insufficient free blocks 43 in the free block pool 430, the controller 14 of the storage device 2 carries out garbage collection with respect to the active blocks 45 in the active block pool 450. During such garbage collection, as shown by arrows 930, the controller 14 of the storage device 2 copies valid data in active blocks 45 subject to garbage collection into an input block 44 in the input block pool 440. Further, during garbage collection, as shown by arrows 940, the controller 14 re-maps the active blocks 45 from which valid data has been copied as free blocks 43, by invalidating all data in the active blocks 45. Garbage collection can be initiated by either the storage device 2 or the host 3.

Figure 10:
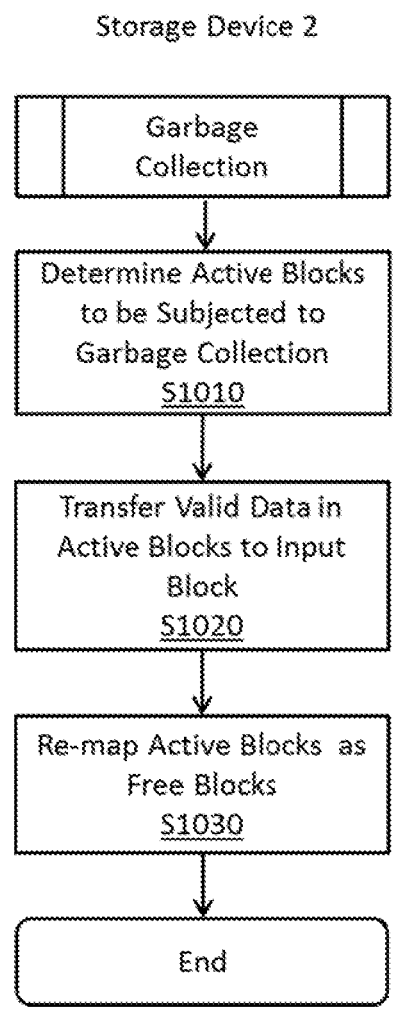
FIG. 10 illustrates a flow of garbage collection carried out in the storage device according to the first embodiment.

FIG. 10 illustrates a flow of garbage collection carried out in the storage device 2. When garbage collection is carried out, the controller 14 of the storage device 2 first determines active blocks 45 to undergo garbage collection, at Step S1010. Here, various types of algorithms can be adopted to determine the active blocks 45 to be subjected to garbage collection (i.e., target active blocks). In one embodiment, active blocks 45 that store a higher ratio of invalid data with respect to valid data may be selected as the target active blocks. For example, in such an embodiment, the first active block 45 selected as a target active block may be the active block that contains the highest ratio of invalid data to valid data. Alternatively, the target active blocks may be determined based on a time when the block has been mapped as an active block 45 or on an age of data in the active blocks 45. That is, an active block 45 that has been mapped earlier than other active blocks 45 or an active block that includes the oldest valid data may be selected as the target active block.

Next, at Step S1020, the controller 14 copies only valid data in the active blocks 45 that are selected as the target active blocks, and transfers the copied data to the input block 44. Here, if the input block 44 does not have sufficient capacity to store the copied data, the controller re-maps one or more of the free blocks 43 as new input block 44. Further, if the input block 44 to which the copied data are transferred becomes full during step S1020, the controller 14 re-maps the input block 44 as an active block 45 in the active block pool 450.

Then, at Step S1030, the controller 14 invalidates all data stored in the target active blocks and re-maps the target active blocks as free blocks 43 in the free block pool 430. Here, the re-mapping corresponds to updating the LUT 19 stored in the RAM 15 (FIG. 3) of the storage device 2. Thereafter, the garbage collection operation ends.

When garbage collection is carried out, some or all valid data, such as temporary data and working files, stored in the target active blocks may not need to be stored therein. In addition, when the storage system 1 includes a main storage device (not shown in FIG. 1) besides the storage device 2 and the storage device 2 serves as a cache memory for the main storage device, data stored in the active blocks 45 of the storage device 2 that have a low cache hit ratio may not need to be stored in the storage device 2. Further, when the storage system 1 includes a secondary storage device (not shown in FIG. 1) that has lower access speed than the storage device 2 and data stored in the active blocks of the storage device 2 are infrequently accessed (i.e., cold data), it may be preferable that the data is moved to the secondary storage device and deleted from the active blocks 45 of the storage device 2. As described, when valid data no longer need to be stored in the storage device 2, copying such valid data may be unnecessary. In view of this, according to the present embodiment, several operations described below are executed, and as a result garbage collection can be carried out more efficiently.

Figure 11:
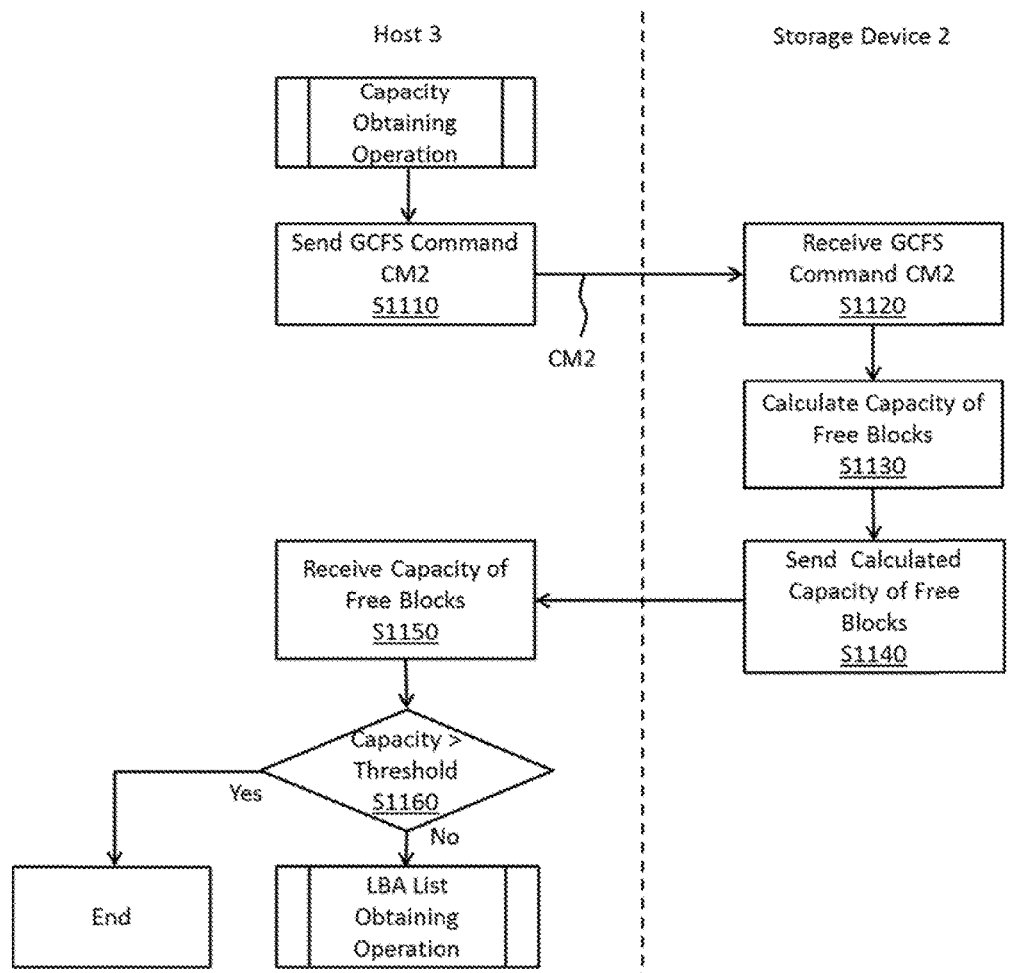
FIG. 11 illustrates a flow of an operation to obtain a capacity of free space in the storage device according to the first embodiment.

The host 3 may need to recognize a capacity of free space in the flash memory 16 (for example, total free blocks 43 in the free block pool 430), such that the host 3 can recognize whether garbage collection is going to be carried out soon. FIG. 11 illustrates a flow of an operation (capacity obtaining operation) to obtain a capacity of free space in the flash memory 16 of the storage device 2.

When the capacity obtaining operation is carried out, the host 3 first sends to the storage device 2 a Get Capacity of Free Space (GCFS) command CM2, at Step S1110. Here, the GCFS command CM2 may not include any parameters, such as starting LBA or sector count.

Then, the storage device 2 receives the GCFS command CM2 from the host 3, at Step 1120. After the storage device 2 receives the GCFS command CM2 from the host 3, the controller 14 of the storage device 2 calculates a capacity of free space in the flash memory 16 by referring to the LUT 19, at Step 1130. Here, the capacity of free space in the flash memory 16 may be, for example, the number of free blocks 43 in the free block pool 430, percentage of free blocks 43 in the free block pool 430, or both of them. Then, the controller 14 sends the calculated capacity to the host 3, at Step 1140.

At Step 1150, the host 3 receives the calculated capacity from the storage device 2. Then, the host 3 determines whether or not the capacity of the free space is greater than a predetermined threshold, at Step S1160. Here, the threshold can be determined in accordance with, for example, a maximum latency of data writing or reading that can be acceptable in the storage system 1. When the capacity is greater than the threshold (yes in Step S1160), the operation to obtain the capacity of free space ends. Also when the capacity is smaller than the threshold (no in Step S1160), the operation to obtain the capacity of free space ends, but further the process moves on to a subsequent operation, which is an operation (LBA list obtaining operation) to obtain an LBA list L1 of active blocks that are tagged to be subject to next garbage collection.

Figure 12:
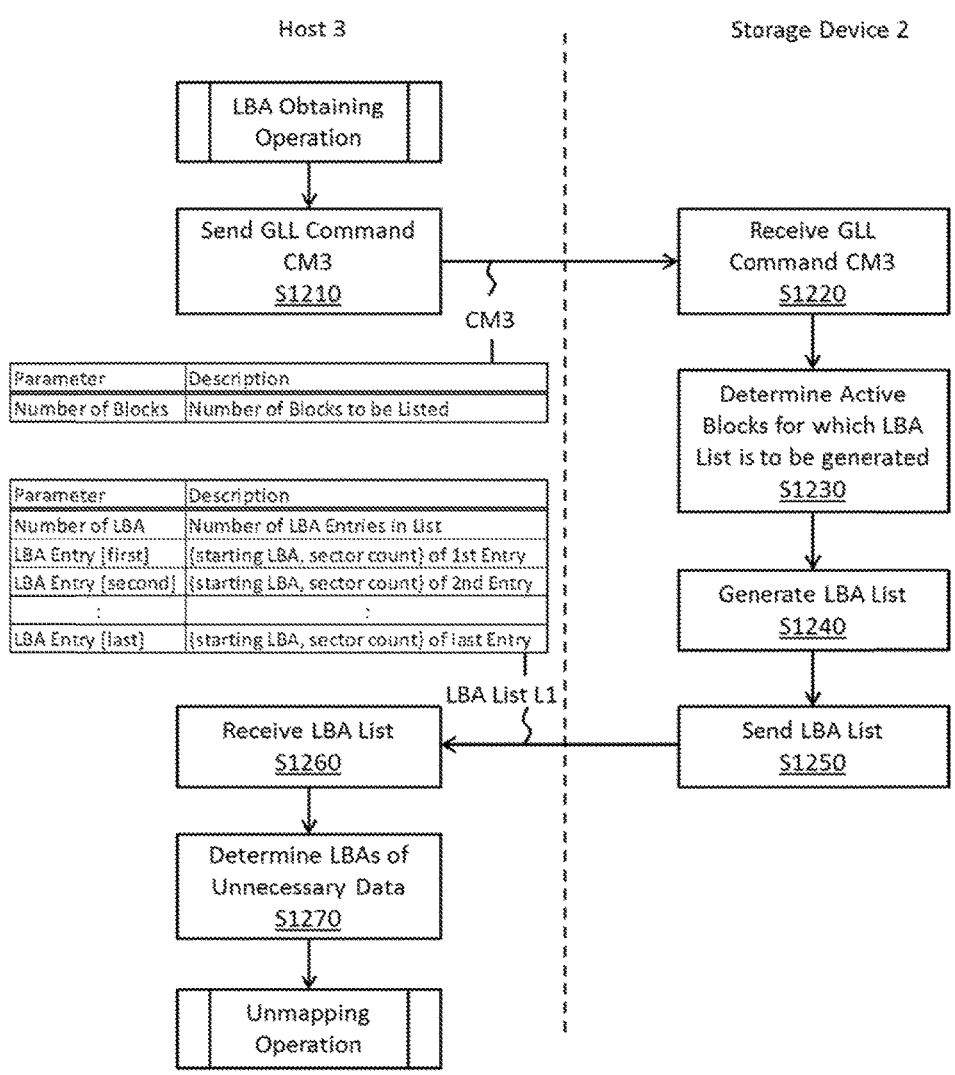
FIG. 12 illustrates an operation to obtain an LBA list of active blocks according to the first embodiment.

FIG. 12 illustrates a flow of the LBA list obtaining operation. As described above, the LBA list obtaining operation is an operation to obtain an LBA list L1 of active blocks 45 that are going to undergo next garbage collection that is to be performed. When the LBA list obtaining operation is carried out, the host 3 first sends to the storage device 2 a Get LBA List (GLL) command CM3, at Step S1210. Here, the GLL command CM3 may include, as a parameter, a number of physical blocks for which an LBA list L1 is generated, as shown in FIG. 12.

At Step S1220, the storage device 2 receives the GLL command CM3 from the host 3. Then, the controller 14 of the storage device 2 determines active blocks 45 (target active blocks) for which the LBA list L1 is to be generated. Here, the number of the active blocks 45 for which the LBA list L1 is to be generated may correspond to the number of blocks specified by the GLL command CM3, when the number is included in the GLL command CM3. To the contrary, when the number is not included in the GLL command CM3, the controller 14 may determine the number of target active blocks. The controller 14 determines the target active blocks based on a probability that each of the active blocks is subjected to next garbage collection that is performed. For example, similar to the determination of active blocks 45 during garbage collection (Step S1010 in FIG. 10), the controller 14 may determine the target active blocks based on the ratio of valid data stored in a particular active block 45 with respect to invalid data stored in the particular active block 45 or on a time when a particular block has been re-mapped as an active block 45.

After the target active blocks are determined, the controller 14 generates an LBA list L1 at Step S1240. When the controller 14 generates the LBA list L1, the controller 14 looks up all LBAs mapped to the target active blocks by referring to the LUT 19. Here, LBAs included in the LBA list L1 may be all LBAs corresponding to the target active blocks, or alternatively LBAs corresponding to valid data in the target active blocks. Specifically, the LBA list L1 includes the number of LBA entries therein, and a starting LBA and a sector count for each LBA entry. Upon generation of the LBA list L1, then the controller 14 sends the generated LBA list L1 to the host 3, at Step S1250.

At Step S1260, the host 3 receives the LBA list L1 from the storage device 2. Then, the host 3 determines LBAs corresponding to data that can be erased from the physical blocks of the flash memory 16 by referring to the OS 11, the file system 12, and/or the application layer 13, at Step S1270. For example, as described above, a cache hit ratio and an access frequency can be used as the criteria to determine whether or not the data stored in LBAs in the LBA list L1 can be erased (no longer necessary). Then the process moves on to an unmapping operation, which is carried out such that the unnecessary data in the active blocks 45 are excluded from data copied during garbage collection.

Figure 13:
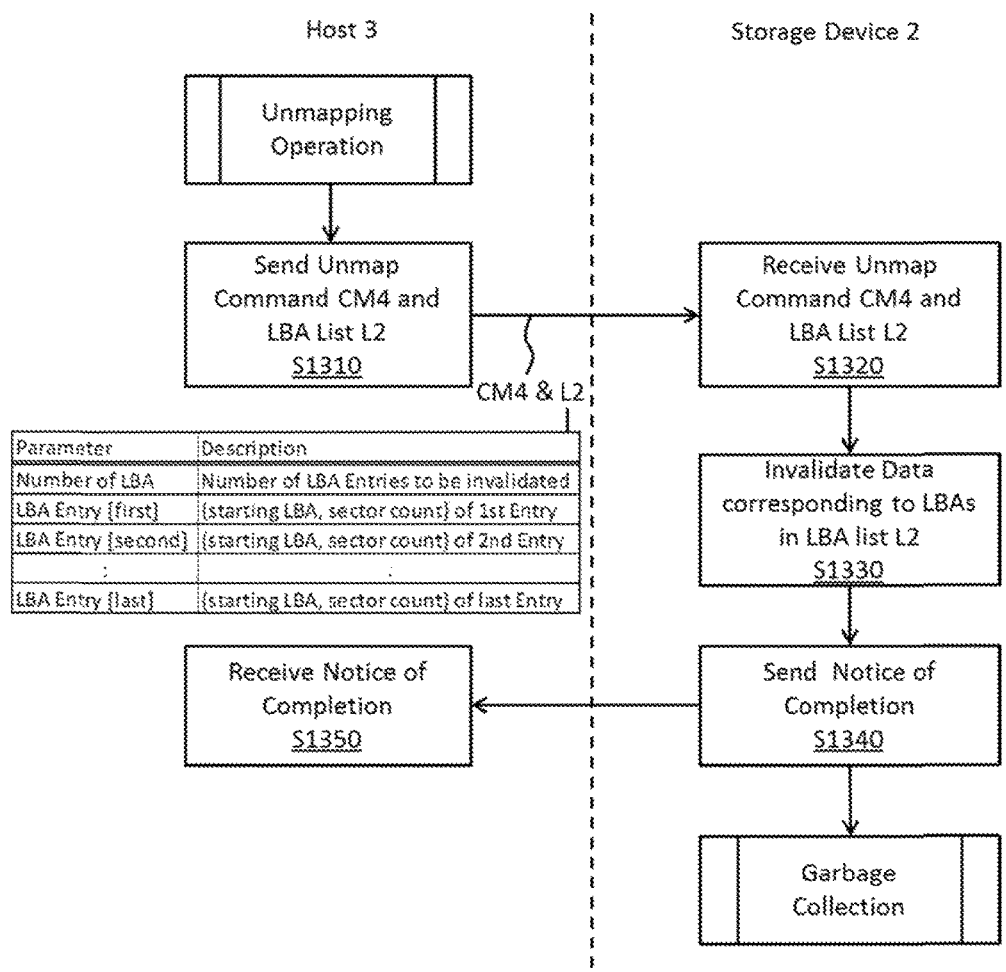
FIG. 13 illustrates a flow of an unmapping operation carried out in the storage device according to the first embodiment.

FIG. 13 illustrates a flow of the unmapping operation. When the unmapping operation is carried out, the host 3 first sends to the storage device 2 an Unmap command (trim command) CM4 and an LBA list L2, at Step S1310. Here, the Unmap command CM4 may include, as parameters, the LBA list L2, which includes a number of LBA entries included therein and a starting LBA and a sector count of each LBA entry. These LBA entries are all or some of the LBA entries included in the LBA list L1 sent from the storage device 2, and correspond to data that can be erased from the flash memory 16 as unnecessary data. The unnecessary data may be, for example, temporary data, cached data of a low cache hit ratio, and cold data.

At Step S1320, the storage device 2 receives the Unmap command CM4 and the LBA list L2 from the host 3. Then, in accordance with the LBA list L2, the controller 14 of the storage device 2 invalidates data corresponding to the LBAs in the LBA list L2 by updating the LUT 19, at Step S1330. When the invalidation completes, the controller 14 sends to the host 3 a notice of completion at Step S1340. When the host 3 receives the notice from the storage device 2 at Step S 1350, the unmapping operation ends.

Figure 14:
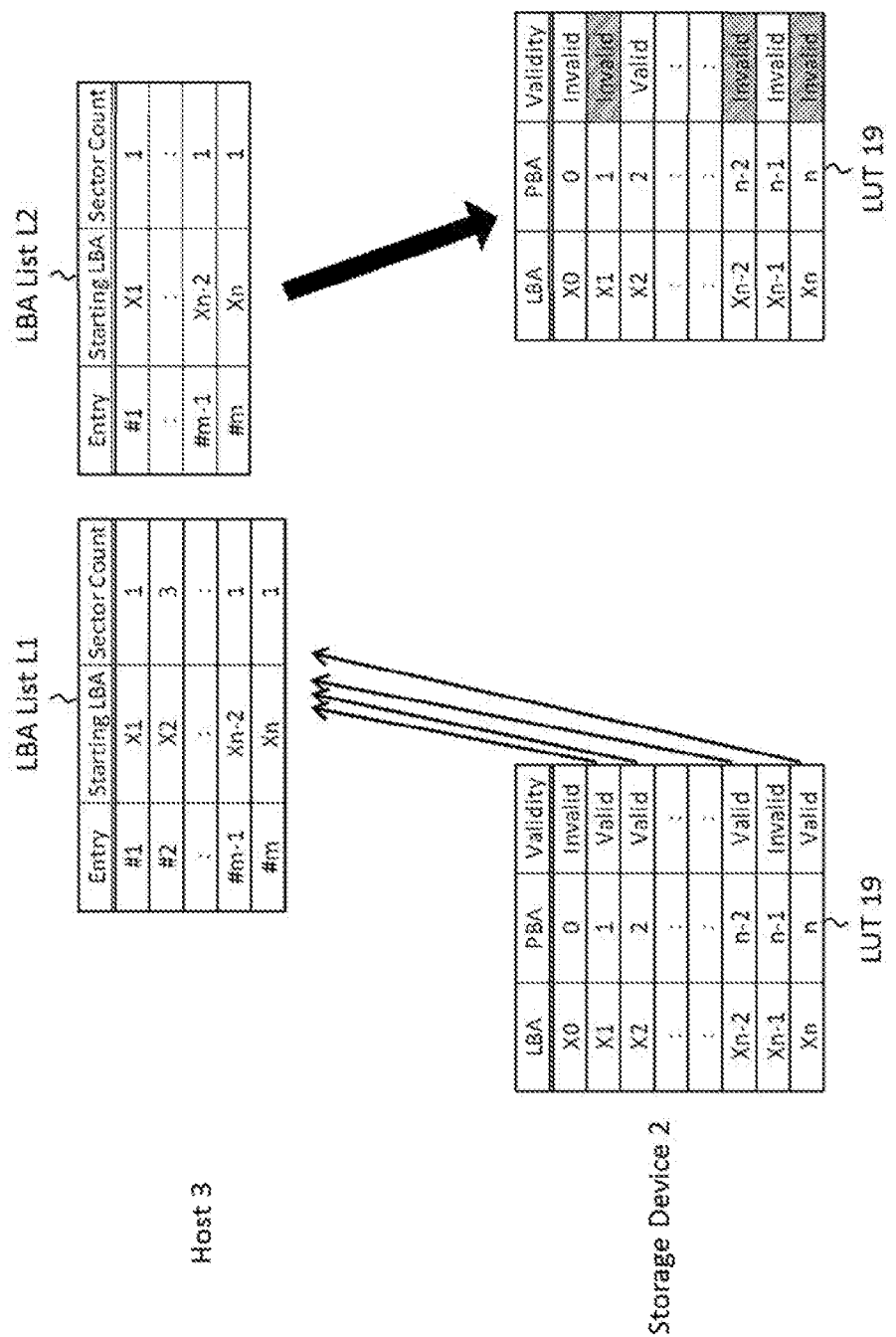
FIG. 14 schematically illustrates an LBA list sent from the storage device to the host and an LBA list sent from the host to the storage device.

FIG. 14 schematically illustrates the LBA list L1 sent from the storage device 2 to the host 3 in Step S1250 in FIG. 12 and the LBA list L2 sent from the host 3 to the storage device 2 in Step S1310 in FIG. 13. In FIG. 14, data invalidated in accordance with the LBA list L2 are cross-hatched. Specifically, data corresponding to X1, Xn−2, and Xn of LBAs are invalidated, and data corresponding to X2 of LBA are not invalidated because the LBA list L2 does not include an LBA entry for X2.

Referring to FIG. 13, the storage device 2, at some point in time after Step S1340, carries out garbage collection, according to its own schedule or triggered by the Unmap command CM4. At least one of the active blocks 45 that is to undergo garbage collection may contain data that have been invalidated in step S1330. If so, since less valid data are copied during garbage collection, garbage collection can be carried out more efficiently. In particular, when none of data in an active block 45 subject to garbage collection are valid, the storage device 2 does not need to copy any of the data in that active block 45. In such a case, as the storage device 2 simply needs to erase data (invalid data) in the active block 45 without copying, garbage collection can be carried out most efficiently.

As the foregoing illustrates, according to the present embodiment, by carrying out the LBA list obtaining operation and the unmapping operation, valid data that no longer need to be stored in the storage device 2 are invalidated. Since such data are not copied and transferred to another block of the storage device 2 when garbage collection is carried out, garbage collection can be carried out more efficiently. Although, in the present embodiment, the LBA list obtaining operation is triggered when the capacity of the free space is smaller than the predetermined threshold, the LBA list obtaining operation can be initiated based on a different condition. Even in such a case, a substantially similar advantage can be achieved.

(Second Embodiment)

Hereinafter, a configuration of a storage system according to a second embodiment is described. As the storage system according to the second embodiment is similar to the one according to the first embodiment, the description is focused on the difference between the two embodiments.

Figure 15:
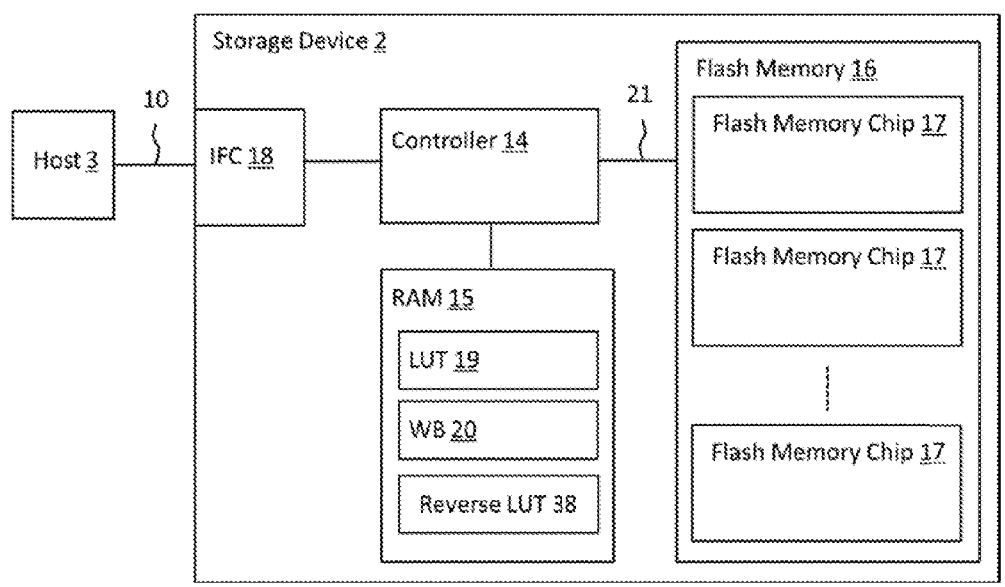
FIG. 15 illustrates a configuration of a storage device according to a second embodiment.

FIG. 15 illustrates a configuration of a storage device 2 according to the second embodiment. A RAM 15 of the storage device 2 according to the second embodiment further includes a reverse LUT 38, in addition to the LUT 19 and the WB 20. The reverse LUT 38 stores an expiration time ET (or a lifetime LT) of written data with respect to each physical address, which can be used to determine whether or not the period of validity of written data has expired.

Figure 16:
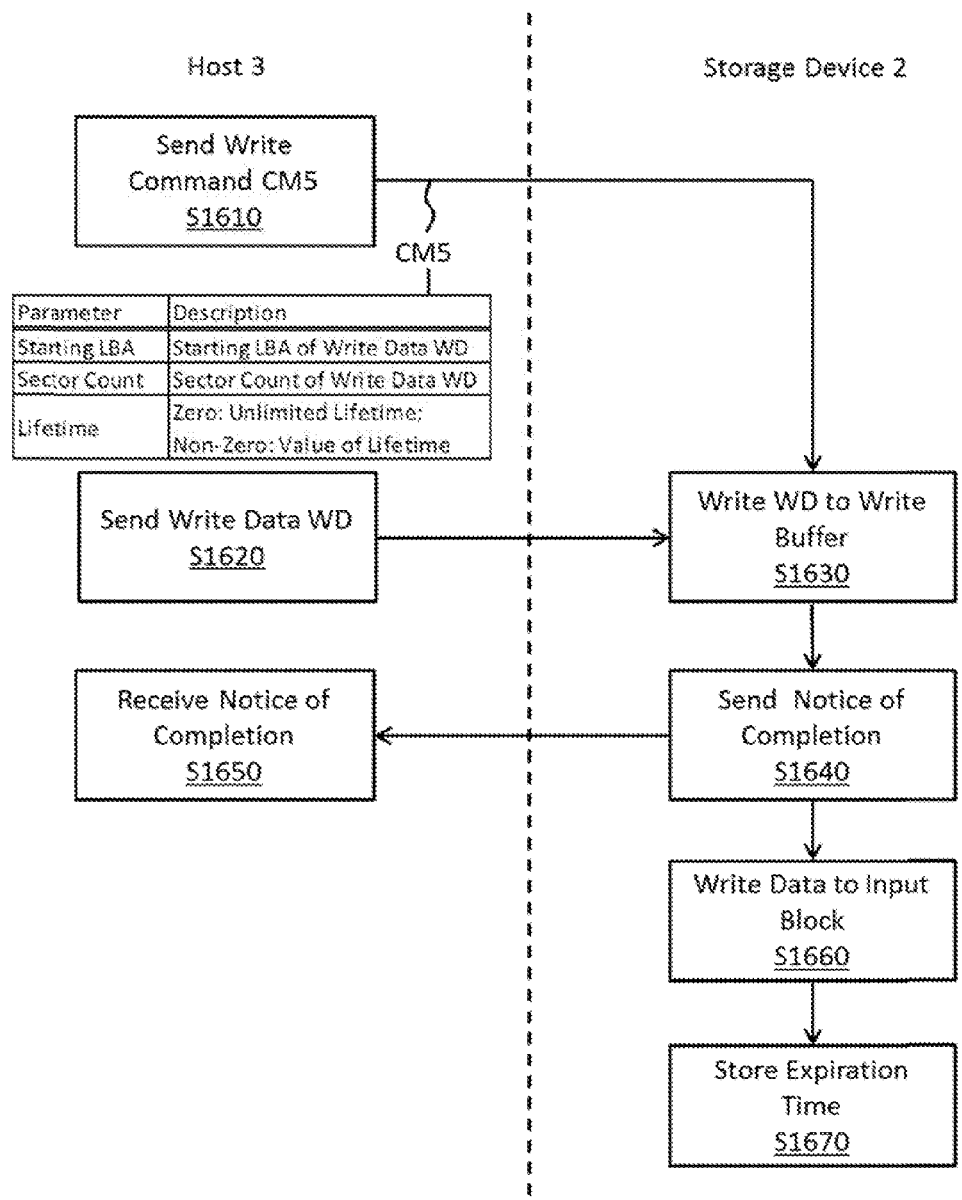
FIG. 16 illustrates a flow of data writing operation carried out in the storage system according to the second embodiment.

FIG. 16 illustrates a flow of data writing operation carried out in the storage system 1 according to the present embodiment. When the data writing operation is carried out, the host 3 first transmits a write command (write request) CM5 to the storage device 2 via the interface 10 at Step S1610. Here, the write command CM5 includes a lifetime LT, as a parameter. When the write command CM5 includes zero as the lifetime LT, that means that the write data to be sent do not expire. Typically, data that are designated to not expire include data that are not likely to become cold data or have low cache hit ratio. On the other hand, when the write command CM5 includes non-zero value as the lifetime LT, the value is the lifetime LT. Examples of data that are designated to expire in this way include data that are likely to become cold data or have low cache hit ratio. The lifetime LT may be determined by the application layer 13 (application 13A in the memory 5 or the application 13B in the client 36), the file system 12, or the OS 11. Thereafter, Steps S1620-S1660 are performed similarly to Steps S820-S860 performed in the first embodiment.

After Step S1660, the controller 14 of the storage device 2 calculates an expiration time ET of the write data and stores the calculated expiration time in the reverse LUT 38 in association with the physical address in which the write data are written, at Step S1670. Here, the controller 14 calculates the expiration time ET, based on the lifetime LT included in the write command CM5 and a current time CT, which is obtained by referring to a clock unit (not shown in FIG. 14). That is, the expiration time ET equals a sum of the current time CT and the lifetime LT (i.e., ET=CT+LT). When the lifetime LT in the write command CM5 is zero, the controller 14 stores a substantially larger value (e.g., an infinite value) as the expiration time ET in the reverse LUT 38.

In the present embodiment, the expiration time ET can be stored page-by-page or block-by-block in the reverse LUT 38. If the expiration time ET is stored block-by-block, the maximum expiration time ET of a plurality of expiration times ET in a block is stored in the reverse LUT 38. Further, the Steps S1660 and S1670 can be executed in a reverse order.

Figure 17:
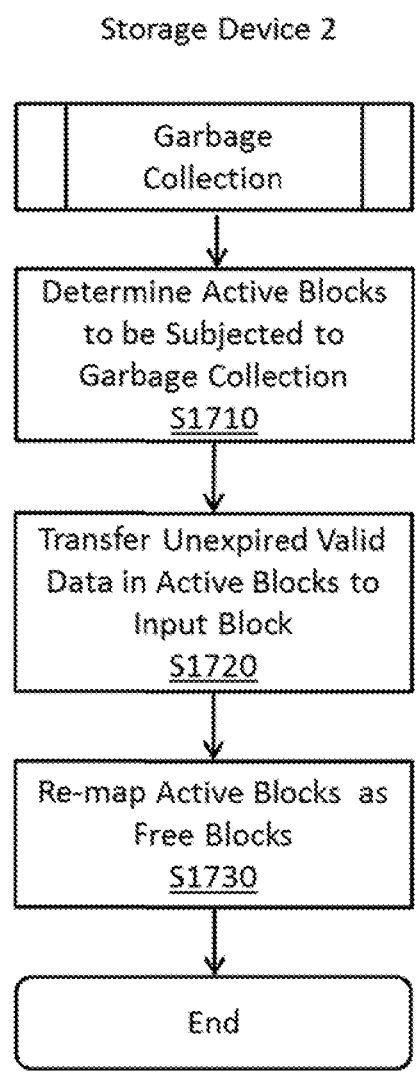
FIG. 17 illustrates a flow of garbage collection carried out in the storage device according to the second embodiment.

FIG. 17 illustrates a flow of garbage collection carried out by the storage device 2 according to the present embodiment. In FIG. 17, Steps S1710 and S1730 are substantially similar to Steps S1010 and S1030 in FIG. 10. In the present embodiment, at Step S1720, valid data that are transferred from the active blocks 45 to the input block 44 include only unexpired data. That is, expired valid data, which have the expiration time ET smaller than a current time CT at the time of garbage collection, are excluded from data transferred to the input block 44. In other words, the controller 14 determines the data as no longer valid, when the expiration time passes. The expired valid data are erased from the storage device 2, similarly to invalid data.

In the present embodiment, the controller 14 of the storage device 2 excludes the expired data from the data to be copied during garbage collection. Alternatively, the controller 14 may periodically monitor the expiration time ET and determine whether or not the expiration time ET has passed. When the expiration time ET has passed, the controller 14 may further invalidate the expired data by updating the LUT 19.

As the foregoing illustrates, according to the second embodiment, the host 3 sends to the storage device 2 a lifetime LT of data to be written (write data) together with the write command CM5. Using the received lifetime LT, the storage device 2 manages an expiration time ET of data written in the storage device 2. When the storage device 2 carries out garbage collection, expired data are not copied and erased from the storage device 2. As less data are copied, garbage collection can be carried out more efficiently.

(Third Embodiment)

Hereinafter, a configuration of a storage system according to a third embodiment is described. As the storage system according to the third embodiment is similar to those configured according to the first and second embodiments, the description of the third embodiment is focused on the differences between the third embodiment and the first and second embodiments.

Figure 18:
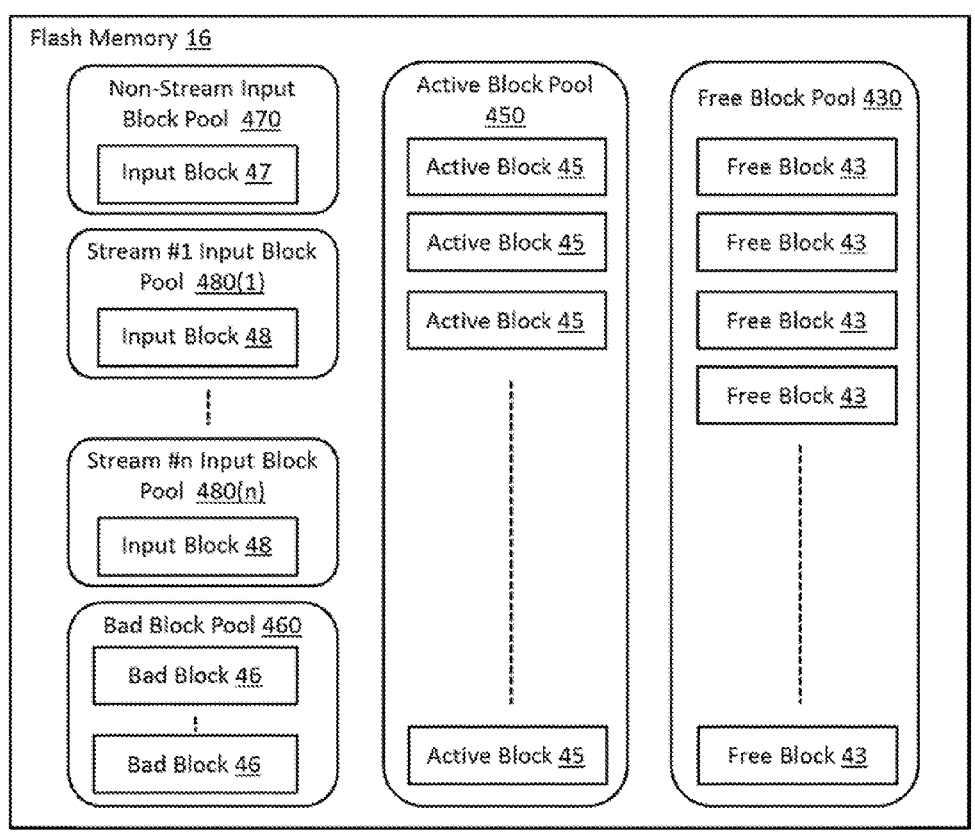
FIG. 18 illustrates an overview of the mapping of the physical blocks based on block pools according to a third embodiment.

FIG. 18 illustrates an overview of the mapping of the physical blocks based on block pools. The block pools according to the third embodiment include a non-stream input block pool 470 and stream input block pools 480(1)-480(n), instead of the input block pool 440. In the non-stream input block pool 470, an input block 47 is mapped, and in each of the stream input block pool 480(1)-480(n), an input block 48 is mapped. Each of the input blocks 48 is associated with a different stream identification code (stream ID), and when write data are associated with a stream ID, then the write data WD are written in one of the input blocks 48 that is associated with the same stream ID. Furthermore, according to the present embodiment, each of the streams (stream IDs or the input blocks 48) is associated with a lifetime LT. That is, write data WD associated with a particular stream ID are given the lifetime LT associated with that particular stream ID. The lifetime LT is specified when a new stream is opened.

Figure 19:
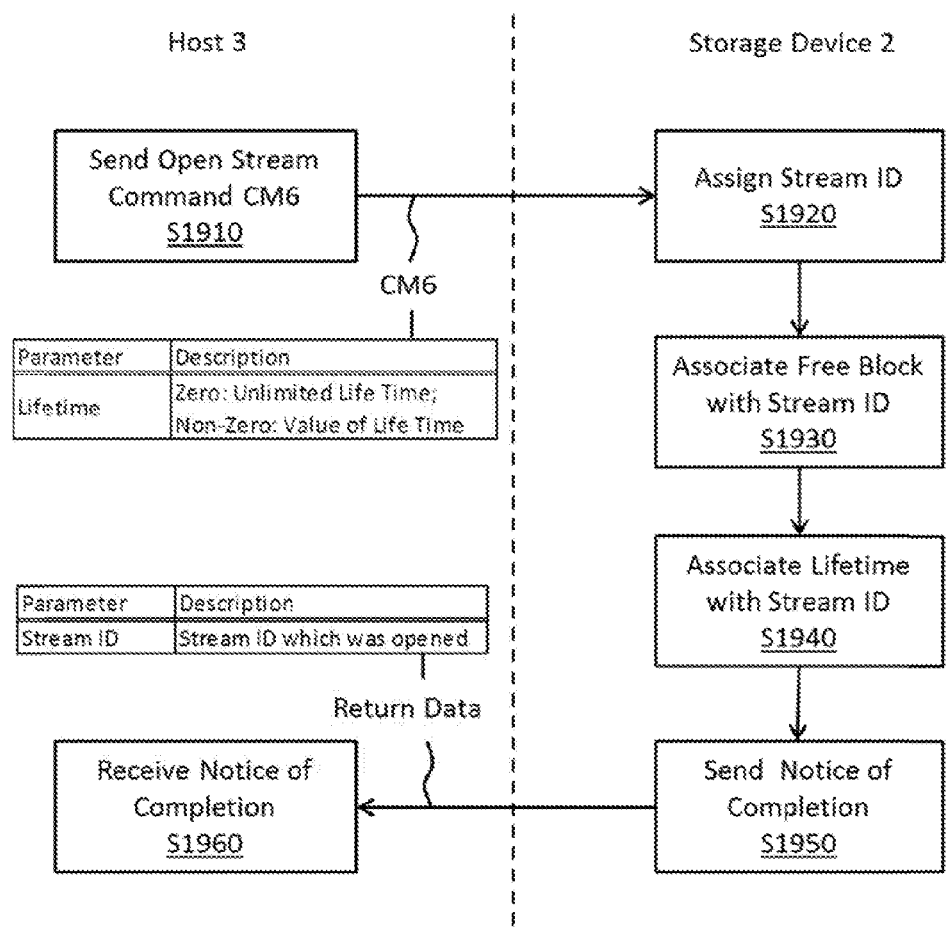
FIG. 19 illustrates a flow of an operation to open a new stream, which is carried out in the storage system according to the third embodiment.

FIG. 19 illustrates a flow of an operation to open a new stream, which is carried out in the storage system 1. As shown, first, at Step S1910, the host 3 transmits an Open Stream command CM6 to the storage device 2. Here, the Open Stream command CM6 includes, as a parameter, a lifetime LT of data to be written in the input block of the stream to be opened. The lifetime LT may be determined based on likelihood that data to be written therein becomes cold data, likelihood that data to be written therein have a low cache hit ratio, or an origin (the application layer 13, the file system 12, or the OS 11) of the data to be written in the stream. When the storage device 2 receives the Open Stream command CM6, the controller 14 of the storage device 2 assigns a stream ID for mapping at Step S1920. Then, the controller 14 associates a free block 43 in the free block pool 430 with the assigned stream ID, and re-maps (re-categorizes) the free block 43 as an input block 48 in the stream block pool 480(n) corresponding to the assigned stream ID by updating the LUT 19, at Step S1930. At Step S1940, the controller 14 associates the lifetime LT included in Open Stream command CM6 with the assigned stream ID, by updating the reverse LUT 38. Alternatively, Steps S1930 and S1940 can be executed in a reverse order. Thereafter, the storage device 2 notifies the host 3 of the assigned stream ID, by sending to the host 3 return data at Step S1950. Here, the return data include, as a parameter, a stream ID, which indicates the assigned stream ID for the opened stream. When the host 3 receives the return data from the storage device 2 at Step S1960, the operation to open a new stream ends.

After a new stream is opened, the data writing operation is carried out in a similar manner as the one according to the second embodiment as illustrated in FIG. 15. However, the write command CM5 in the present embodiment includes a stream ID, instead of the lifetime LT, as a parameter. Further, at Step S1670, the expiration time ET is calculated based on the lifetime LT received when the stream is opened. That is, the same lifetime LT is applied to all write data written in the stream input block 48 of the same stream. After the data writing operation is carried out, garbage collection is carried out in similar manner as described above in conjunction with FIG. 16 and according to the second embodiment.

As the foregoing illustrates, according to the third embodiment, the host 3 sends to the storage device 2 a lifetime of data to be written (write data) together with the Open Stream command CM6. Using the received lifetime LT, the storage device 2 manages an expiration time ET of data written in the stream input block 48 of the storage device 2. When the storage device 2 carries out garbage collection, expired data are not copied and erased from the storage device 2. As less data are copied, garbage collection can be carried out more efficiently.

(Fourth Embodiment)

Hereinafter, a configuration of a storage system according to a fourth embodiment is described. As the storage system according to the fourth embodiment is similar to those configured according to the first embodiment, the description of the fourth embodiment is focused on the differences between the fourth embodiment and the first embodiment.

Figure 20:
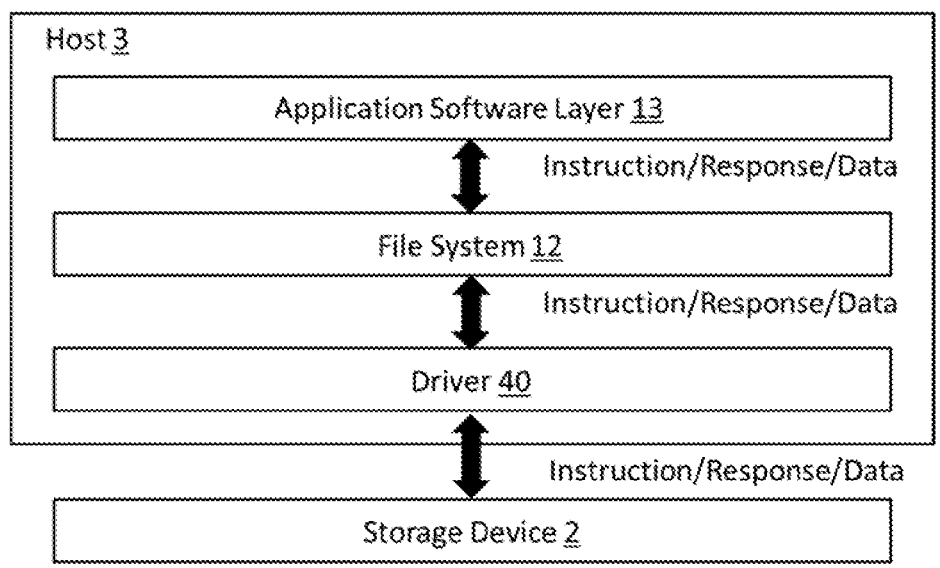
FIG. 20 illustrates a software layer structure of a storage system according to a fourth embodiment.

FIG. 20 illustrates a structure of the software layers of the storage system 1 according to the present embodiment. In FIG. 20, a driver 40 is provided between the file system 12 and the storage device 2. Here, the application software layer 13, the file system 12, and the driver 40 are included within the host 3. When the application software layer 13 transmits to the storage device 2 a request, such as a read request or a write request, the request is transmitted from the application software layer 13 to the file system 12, the driver 40, and the storage device 2, in order. Similarly, a response from the storage device 2 is transmitted to the driver 40, the file system 12, and the application software layer 13, in order. That is, in the host 3, each of the file system 12 and the driver 40 performs part of functions of the host 3 of the above embodiments. In the following, steps carried out by each of the file system 12 and the driver 40 in the host 3 are specifically described.

Figure 21:
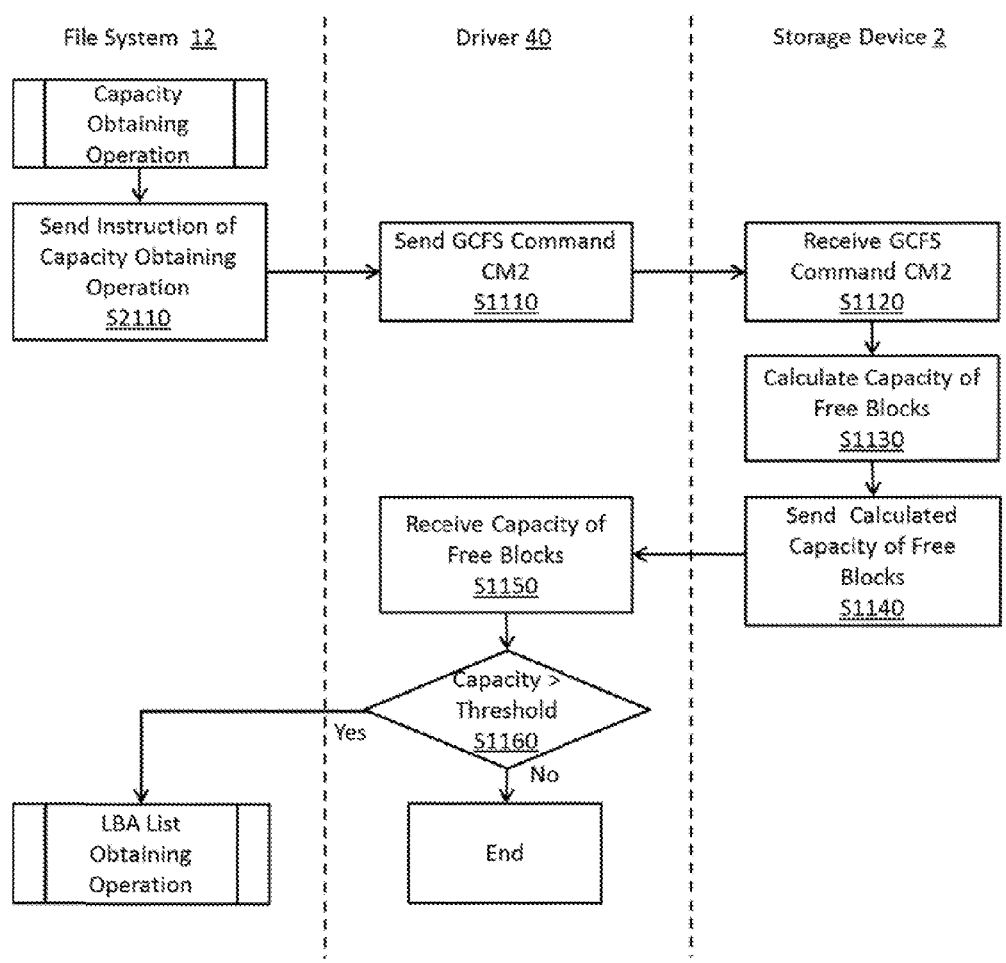
FIG. 21 illustrates a flow of an operation to obtain a capacity of free space in the storage device according to the fourth embodiment.

The host 3 according to the present embodiment may carry out the capacity obtaining operation to obtain a capacity of free space in the flash memory 16 of the storage device 2. FIG. 21 illustrates a flow of the capacity obtaining operation carried out in the host 3, specifically the file system 12 and the driver 40, and the storage device 2.

When the capacity obtaining operation is carried out, the file system 12 first sends to the driver 40 an instruction to start the capacity obtaining operation, at Step S2110. Then, the driver 40 receives the instruction from the file system 12. After the driver 40 receives the instruction, the driver 40 and the storage device 2 carry out Steps S1110-S1160 in a similar manner as Steps S1110-S1160 shown in FIG. 11. When the capacity is smaller than the threshold (no in Step S1160), then the operation to obtain the capacity of free space ends, and the driver 40 requests the file system 12 to start a subsequent operation, i.e., the LBA list obtaining operation.

Figure 22:
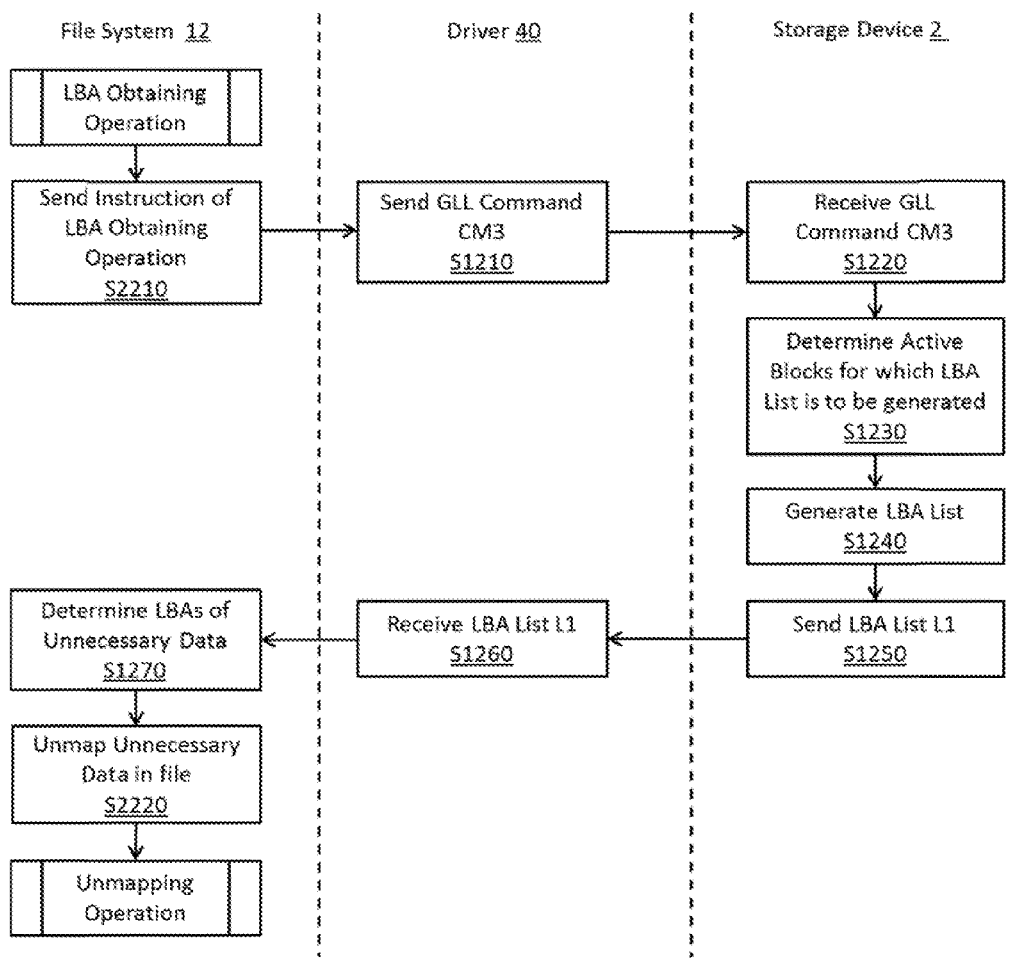
FIG. 22 illustrates an operation to obtain an LBA list of active blocks according to the fourth embodiment.

FIG. 22 illustrates a flow of the LBA list obtaining operation according to the fourth embodiment. As described above, the LBA list obtaining operation is an operation to obtain an LBA list L1 of active blocks 45 that are going to undergo the next garbage collection. When the LBA list obtaining operation is carried out, the file system 12 first sends to the driver 40 an instruction to start the LBA list obtaining operation, at Step S2210. Then, the driver 40 receives the instruction from the file system 12. After the driver 40 receives the instruction, the driver 40 and the storage device 2 carry out Steps S1210-S1260 in a similar manner as Steps S1210-S1260 shown in FIG. 12.

After the driver 40 receives the LBA list L1 from the storage device 2, at Step 1260, the driver 40 sends the LBA list L1 to the file system 12. Then, the file system 12 determines LBAs corresponding to data that can be erased from the physical blocks of the flash memory 16, at Step S1270 in a manner similar to Step S1270 shown in FIG. 12. When the file system 12 determines the LBAs at Step S1270, then the file system 12 unmaps the determined LBAs in index data managed by the file system 12, at Step S2220, such that the map/unmap state of the LBAs in the index data—will be synchronized with (i.e., correspond to) the map/unmap state of the LBAs in the LUT 19 at Step S1340. Thereafter, the file system 12 initiates the unmapping operation to unmap the determined LBAs in the LBA list L2.

Figure 23:
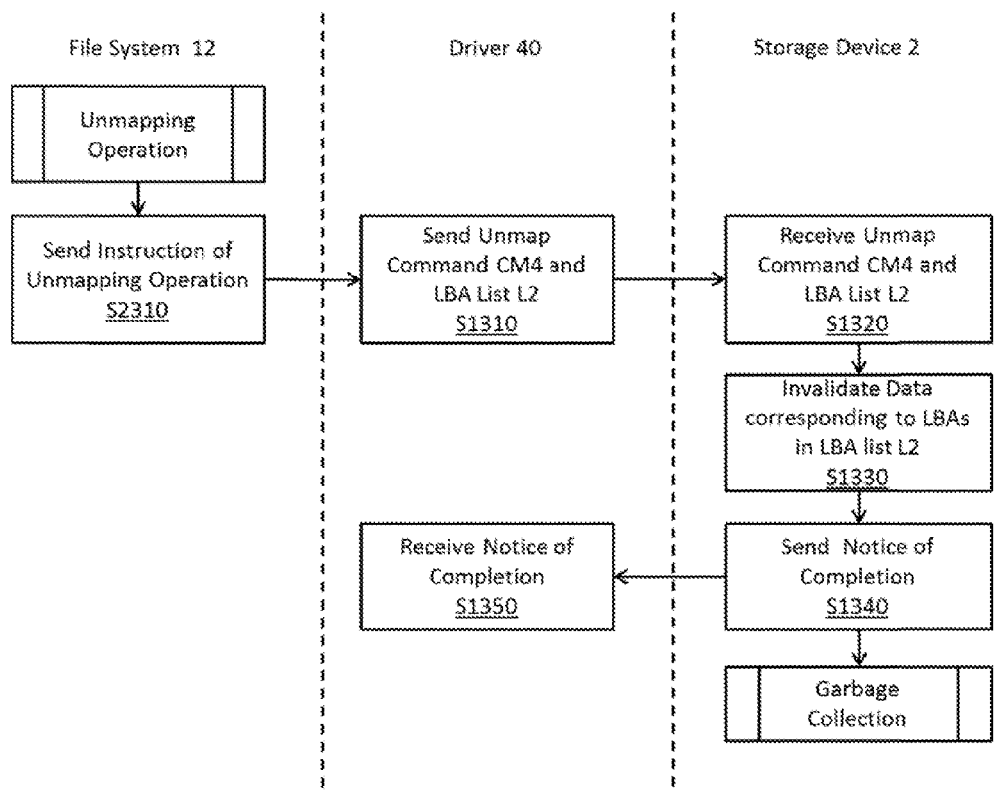
FIG. 23 illustrates a flow of an unmapping operation carried out in the storage device according to the fourth embodiment.

FIG. 23 illustrates a flow of the unmapping operation according to the present embodiment. When the unmapping operation is carried out, first the file system 12 sends to the driver 40 an instruction to start the unmapping operation, at Step S2310. Then, the driver 40 receives the instruction from the file system 12. After the driver 40 receives the instruction, the driver 40 and the storage device 2 carry out Steps S1310-S1350 in a similar manner as Steps S1110-S1150 shown in FIG. 13.

According to the fourth embodiment, each of the file system 12 and the driver 40 performs part of functions of the host 3. Specifically, the file system 12 initiates the capacity obtaining operation (FIG. 21), the LBA list obtaining operation (FIG. 22), and the unmapping operation (FIG. 23). Further, the file system 12, as well as the storage device 2, unmaps LBAs corresponding to unnecessary data. Further, according to the present embodiment, the host 3, at the level of the file system 12, makes decisions of whether to obtain the LBA list L1 and whether to unmap LBAs in the LBA list L1. This is because the file system 12 operates to manage organization of data stored in the storage device 2.

According to the present embodiment, similarly to the first embodiment, valid data that no longer need to be stored in the storage device 2 are not copied and transferred to another block of the storage device 2 when garbage collection is carried out. As a result, garbage collection can be carried out more efficiently.

(Fifth Embodiment)

Hereinafter, a configuration of a storage system according to a fifth embodiment is described. As the storage system according to the fifth embodiment is similar to those configured according to the first and fourth embodiments, the description of the fifth embodiment is focused on the differences between the fifth embodiment and the first and fourth embodiments.

In the fifth embodiment, the software layer structure of the storage system 1 is substantially similar to the one according to the fourth embodiment shown in FIG. 20. That is, the communication between the host 3 and the storage device 2 is carried out from the application software layer 13 to the file system 12, the driver 40, and the storage device 2, in order, and from the storage device 2, to the driver 40, the file system 12, and the application software layer 13, in order.

Figure 24:
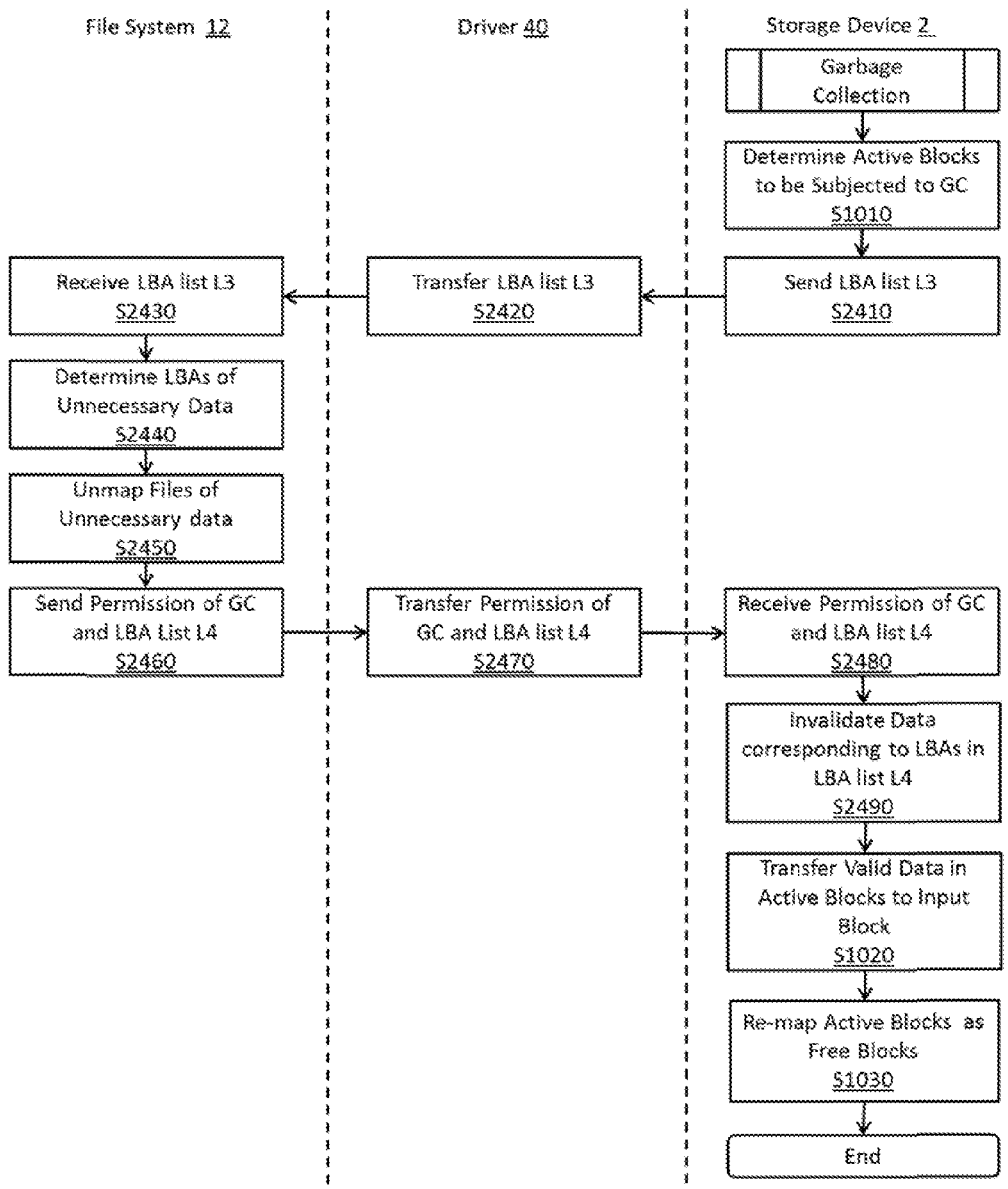
FIG. 24 illustrates a flow of garbage collection carried out in a storage system according to a fifth embodiment.

The storage device 2 according to the present embodiment may carry out garbage collection similarly to the first embodiment. That is, the storage device 2 initiates garbage collection on its own schedule. FIG. 24 illustrates a flow of garbage collection according to the present embodiment. In FIG. 24, part of the steps are carried out on the side of the host 3, i.e., by the driver 40 and the file system 12.

When garbage collection is carried out, the controller 14 of the storage device 2 first determines active blocks 45 to undergo garbage collection, at Step S1010, similarly to Steps S1010 in FIG. 10. Then, the controller 14 of the storage device 2 generates an LBA list L3 of the active blocks that are going to undergo next garbage collection that is to be performed, and transmits the LBA list L3 through the IFC 18 to the driver 40 of the host 3, at Step S2410. The driver 40 transfers the LBA list L3 received from the storage device 2 to the file system 12, at Step S2420.

At Step 2430, the file system 12 receives the LBA list L3 from the driver 40. Then, the file system 12 determines LBAs corresponding to data (unnecessary data) that can be erased from the physical blocks of the flash memory 16, at Step S2440, similarly to Step S1270 in FIG. 12. When the file system 12 determines the LBAs at Step S2440, then the file system 12 unmaps the determined LBAs in index data managed by the file system 12, at Step S2450, similarly to Step S2220 in FIG. 22. When the unmapping operation is carried out, the file system 12 sends to the driver 40 a permission of garbage collection and an LBA list L4, which indicates LBAs corresponding to the unnecessary data, at Step S2460. Here, the order of Step S2450 and Step S2460 may be reversed. Then, the driver 40 transfers the LBA list L4 received from the file system 12 to the storage device 2, at Step S2470.

At Step S2480, the storage device 2 receives the permission of garbage collection and the LBA list L4 from the driver 40. Then, in accordance with the LBA list L4, the controller 14 of the storage device invalidates data corresponding to the LBAs in the LBA list L4 by updating the LUT 19, at Step S2490. After the invalidation completes, the controller 14 of the storage device 2 performs transfer of valid data in active blocks 45 that are to undergo garbage collection (Step 1020) and re-mapping of the active blocks 45 (Step S1030) as the ones shown in FIG. 10. When the re-mapping at Step S1030 ends, garbage collection ends.

According to the fifth embodiment, the storage device 2 inquires the host 3 of whether or not the blocks that are to undergo garbage collection include unnecessary data, and the file system 12 of the host 3 returns LBAs corresponding to the unnecessary data. The storage device 2 performs garbage collection after invalidating data corresponding to the returned LBAs from the file system 12. Since the unnecessary data are invalidated before garbage collection is performed, garbage collection can be carried out more efficiently.

Further, according to the present embodiment, the host 3, at the level of the file system 12, makes decisions of LBAs that will undergo garbage collection. This is because the file system 12 operates to manage organization of data stored in the storage device 2.

(Sixth Embodiment)

Hereinafter, a configuration of a storage system according to a sixth embodiment is described. As the storage system according to the sixth embodiment is similar to those configured according to the first, second, and fourth embodiments, the description of the sixth embodiment is focused on the differences between the sixth embodiment and the first, second, and fourth embodiments.

In the present embodiment, the software layer structure of the storage system 1 is substantially similar to the one according to the fourth embodiment shown in FIG. 20. Further, similarly to the second embodiment, each of data stored in the flash memory 16 of the storage device 2 is associated with lifetime LT. That is, data stored in the flash memory 16 may expires in accordance with lifetime LT associated therewith.

Figure 25:
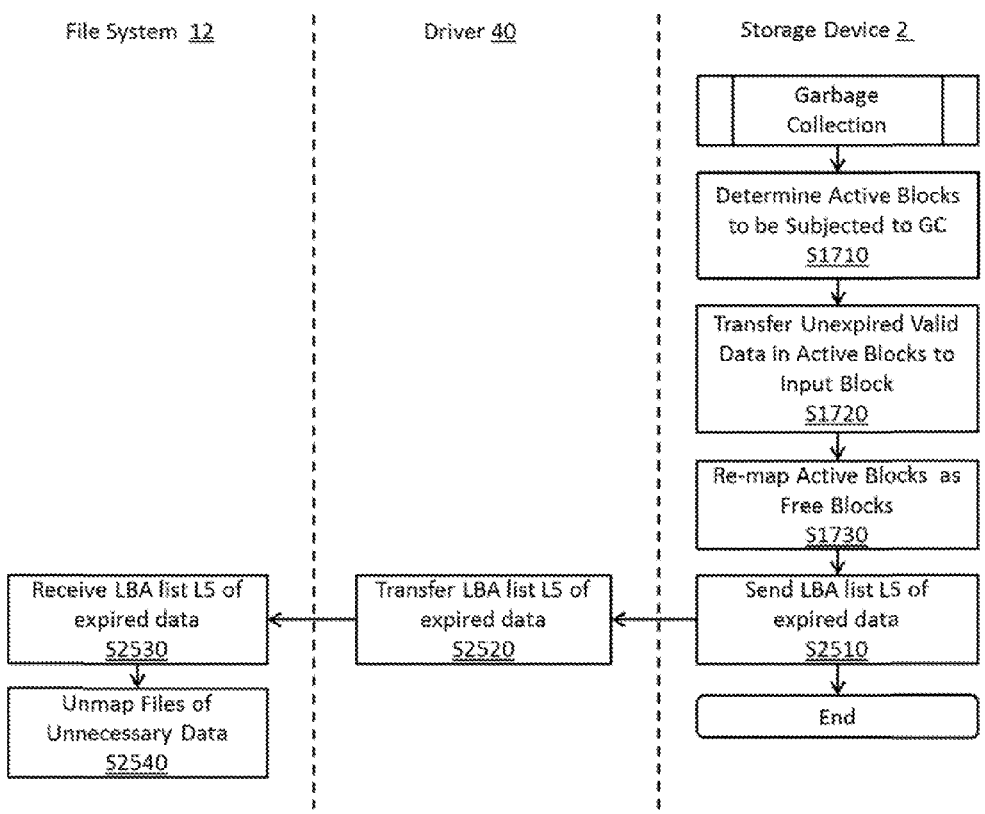
FIG. 25 illustrates a flow of garbage collection carried out in a storage system according to a sixth embodiment.

FIG. 25 illustrates a flow of garbage collection carried out by the storage device 2 according to the present embodiment. When garbage collection is carried out, the controller 14 of the storage device 2 performs Steps S1710-S1730 in a similar manner as Steps S1710-S1730 shown in FIG. 17. That is, expired valid data are not subjected to garbage collection and eventually erased from the storage device 2, similarly to invalid data. After the remapping of the active blocks is finished, then the controller 14 generates an LBA list L5 of the active blocks 45 that have undergone the garbage collection and indicating LBAs of the expired data, and transmits the LBA list L5 through the IFC 18 to the driver 40 of the host 3, at Step S2510.

At Step S2520, the driver 40 transfers the LBA list L5 received from the storage device 2 to the file system 12. At Step 2530, the file system receives the LBA list L5 from the driver 40. Then, the file system 12 unmaps the determined LBAs in index data managed by the file system 12, at Step S2540, similarly to Step S2220 in FIG. 22.

According to the sixth embodiment, in addition to the garbage collection according to the second embodiment, the file system 12 of the host 3 receives the LBA list L5 indicating LBAs of expired data from the storage device 2, and unmaps the received LBAs in index data managed thereby, such that the map/unmap state of the LBAs in the index data are synchronized with the map/unmap state of the LBAs in the LUT 19. Since the expired data are not copied, garbage collection can be carried out more efficiently. Further, the host 3 can also manage the expired data as invalid data. While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device, comprising:
   a non-volatile semiconductor storage device including a plurality of physical blocks; and
   a controller configured to
   maintain a mapping of logical addresses to locations within the physical blocks,
   in response to a first command from a host determine one or more physical blocks that are targeted for a garbage collection process, and send, to the host, a first list that contains logical addresses mapped to locations within the one or more target physical blocks that are targeted for garbage collection, and
   in response to a second command from the host with a second list that contains one or more, but less than all of, logical addresses in the first list, invalidate data stored in the logical addresses in the second list, and copy data from the target physical blocks, including data stored in the logical addresses in the first list but not in the second list and excluding the invalidated data, to one or more other physical blocks.

2. The storage device according to claim 1, wherein the data stored in the logical addresses in the first list includes both valid and invalid data.

3. The storage device according to claim 1, wherein the data stored in the logical addresses in the first list includes only valid data.

4. The storage device according to claim 1, wherein the logical addresses in the first list are mapped to locations within physical blocks that are selected based on age of valid data contained in the physical blocks.

5. The storage device according to claim 1, wherein the logical addresses in the first list are mapped to locations within physical blocks that are selected based on a ratio of invalid data to valid data contained in the physical blocks.

6. A computing device comprising a processing unit programmed to carry out a method of communicating with a storage device including a plurality of physical blocks, said method comprising:
   sending to the storage device a first command to cause the storage device to determine one or more physical blocks that are targeted for a garbage collection process;
   receiving from the storage device, after the storage device has determined one or more physical blocks that are targeted for the garbage collection process, a first list that contains logical addresses mapped to locations within the one or more target physical blocks that are targeted for garbage collection;
   generating a second list that contains one or more, but less than all of, logical addresses in the first list; and
   transmitting a second command to the storage device with the second list, so as to cause the storage device to invalidate data stored in the logical addresses in the second list and copy data from the target physical blocks, including data stored in the logical addresses in the first list but not in the second list and excluding the invalidated data, to one or more other physical blocks.

7. The computing device according to claim 6, wherein the data stored in the logical addresses in the second list includes only valid data.

8. The computing device according to claim 6, wherein the logical addresses contained in the second list correspond to data that are determined to be unnecessary.

9. The computing device according to claim 8, wherein the data are determined to be unnecessary, based on a cache hit ratio with respect to the data or a frequency of access to the data.

10. The computing device according to claim 6, wherein a file system of the computing device causes the processing unit to generate the second list, and a driver of the computing device causes the processing unit to send the generated second list to the storage device.

11. The computing device according to claim 6, wherein the method further comprises:
    updating index data stored in the computing device, so as to reflect the invalidation of the data stored in the logical addresses in the second list.

12. The storage device according to claim 1, wherein the first command is a command for requesting a list of logical addresses mapped to locations within a designated number of target physical blocks that are targeted for garbage collection.

13. The storage device according to claim 12, wherein the second command is a command that specifies one or more of the logical addresses indicated in the list requested by the first command.

14. The computing device according to claim 6, wherein the first command is a command for requesting a list of logical addresses mapped to locations within a designated number of target physical blocks that are targeted for garbage collection.

15. The computing device according to claim 14, wherein the second command is a command that specifies one or more of the logical addresses indicated in the list requested by the first command.

* * * * *